(12) United States Patent
Tayagaki et al.

(10) Patent No.: US 10,731,020 B2
(45) Date of Patent: Aug. 4, 2020

(54) RUBBER COMPOSITION FOR VULCANIZATION MOLDING, PROCESS FOR MANUFACTURING THE SAME AND APPLICATION THEREOF

(71) Applicant: MATSUMOTO YUSHI-SEIYAKU CO., LTD., Yao-shi, Osaka (JP)

(72) Inventors: Naoya Tayagaki, Yao (JP); Katsushi Miki, Yao (JP)

(73) Assignee: MATSUMOTO YUSHI-SEIYAKU CO., LTD., Osaka (JP)

( * ) Notice: Subject to any disclaimer, the term of this patent is extended or adjusted under 35 U.S.C. 154(b) by 96 days.

(21) Appl. No.: 15/746,232

(22) PCT Filed: Jul. 8, 2016

(86) PCT No.: PCT/JP2016/070213
§ 371 (c)(1),
(2) Date: Jan. 19, 2018

(87) PCT Pub. No.: WO2017/014064
PCT Pub. Date: Jan. 26, 2017

(65) Prior Publication Data
US 2018/0208733 A1    Jul. 26, 2018

(30) Foreign Application Priority Data

Jul. 23, 2015  (JP) .................... 2015-145392

(51) Int. Cl.
| | | |
|---|---|---|
| *C08J 9/18* | (2006.01) | |
| *C08J 9/22* | (2006.01) | |
| *B29B 7/74* | (2006.01) | |
| *C08J 9/32* | (2006.01) | |
| *C08J 3/22* | (2006.01) | |
| B29C 35/08 | (2006.01) | |
| B29K 105/16 | (2006.01) | |
| B29C 35/02 | (2006.01) | |
| B29B 7/90 | (2006.01) | |
| B29B 7/18 | (2006.01) | |
| B29B 7/00 | (2006.01) | |
| B29K 21/00 | (2006.01) | |
| B29K 105/04 | (2006.01) | |
| B29K 105/24 | (2006.01) | |

(52) U.S. Cl.
CPC .............. *C08J 9/18* (2013.01); *B29B 7/7495* (2013.01); *C08J 3/22* (2013.01); *C08J 9/32* (2013.01); B29B 7/005 (2013.01); B29B 7/183 (2013.01); B29B 7/90 (2013.01); B29C 35/02 (2013.01); B29C 2035/085 (2013.01); B29C 2035/0833 (2013.01); B29C 2035/0877 (2013.01); B29K 2021/003 (2013.01); B29K 2105/048 (2013.01); B29K 2105/16 (2013.01); B29K 2105/165 (2013.01); B29K 2105/24 (2013.01); C08J 2201/026 (2013.01); C08J 2203/22 (2013.01); C08J 2205/06 (2013.01); C08J 2307/00 (2013.01); C08J 2309/00 (2013.01); C08J 2309/02 (2013.01); C08J 2311/00 (2013.01); C08J 2319/00 (2013.01); C08J 2323/16 (2013.01)

(58) Field of Classification Search
CPC ............................. C08J 9/18; C08J 2309/00
See application file for complete search history.

(56) References Cited

U.S. PATENT DOCUMENTS

| | | | | |
|---|---|---|---|---|
| 6,527,022 | B2 * | 3/2003 | Visel ..................... | B60C 1/0016 152/209.1 |
| 2005/0080151 | A1 * | 4/2005 | Miki ....................... | B01J 13/14 521/50 |
| 2010/0204349 | A1 | 8/2010 | Inohara et al. | |
| 2012/0289620 | A1 * | 11/2012 | Deheunynck ......... | C08F 255/02 521/140 |

FOREIGN PATENT DOCUMENTS

| | | |
|---|---|---|
| CN | 1697868 A | 11/2005 |
| CN | 101827911 A | 9/2010 |
| JP | 61-185710 A | 8/1986 |
| JP | 10-174601 A | 6/1998 |
| JP | 2011-256223 A | 12/2011 |
| JP | 2012-201708 A | 10/2012 |
| JP | 2012201708 A * | 10/2012 |

OTHER PUBLICATIONS

International Search Report for PCT/JP2016/070213 dated Aug. 30, 2016 [PCT/ISA/210].

Office Action dated Mar. 19, 2020 from the China National Intellectual Property Administration in Chinese application No. 201680043286.9.

* cited by examiner

*Primary Examiner* — Kara B Boyle
(74) *Attorney, Agent, or Firm* — Sughrue Mion, PLLC

(57) ABSTRACT

A rubber composition for vulcanization molding which can be manufactured into a rubber product with good dimensional stability, good appearance and sufficiently light weight, a process for manufacturing the same, and applications thereof. A rubber composition for vulcanization molding containing hollow particles and a base rubber, wherein the hollow particles are composed of a thermoplastic resin shell and a thermally vaporizable blowing agent encapsulated therein and have a specified further expansion ratio, and the base rubber has a Mooney viscosity ML (1+4) ranging from 5 to 90 at 100° C. Also disclosed is a process for manufacturing the rubber composition, hollow particles used for manufacturing the rubber composition, a masterbatch including the hollow particles and a rubber product manufactured from the rubber composition.

14 Claims, 2 Drawing Sheets

RUBBER COMPOSITION FOR VULCANIZATION MOLDING, PROCESS FOR MANUFACTURING THE SAME AND APPLICATION THEREOF

CROSS-REFERENCE TO RELATED APPLICATIONS

This application is a National Stage of International Application No. PCT/JP2016/070213 filed Jul. 8, 2016 which claims priority from Japanese Patent Application No. 2015-145392 filed Jul. 23, 2015, the contents of all of which are incorporated herein by reference in their entirety.

BACKGROUND OF THE INVENTION

1. Field of the Invention

The present invention relates to a rubber composition for vulcanization molding, a process for manufacturing the same, and applications thereof.

2. Description of the Related Art

Rubber products for automobiles including automotive fluid hoses, air hoses, door seals and weather-strips are required to be lightweight to save fuel consumption, and rubber products for the construction industry or shoe sole rubbers are required to be lightweight and cost saving as a filler.

In one of the most common conventional process for manufacturing lightweight rubber products, an organic or inorganic blowing agent is added in rubber and heated to generate a gas through chemical decomposition so as to generate bubbles and make the rubber porous (PTL 1). This process, however, is problematic in that the resulting molded rubber products have poor dimensional stability. This is because the gas generation and bubbling through the decomposition of the blowing agent are accompanied by a cross-linking reaction of the rubber which considerably changes the viscosity of the rubber and makes adjusting the bubble size (the size of cells in the rubber) difficult. As a result, a considerable change in size or poor dimensional stability of the rubber products is caused by a slight change in processing conditions.

In another process, for example, in the process disclosed in PTL 2, molded porous rubber products are manufactured by adding unexpanded heat-expandable microspheres to an unvulcanized rubber material and expanding the microspheres in vulcanization to form cells in the rubber material. In the process of PTL 2, the heat-expandable microspheres expand in the vulcanization molding of the rubber material to form cells in the rubber material. The process also encounters a problem of poor dimensional stability of the molded rubber products. This is due to simultaneous vulcanization of the rubber material and expansion of heat-expandable microspheres which causes difficulty in adjusting the expansion of the heat-expandable microspheres. The process encounters another problem, namely, poor appearance of the final products due to expansion of the heat-expandable microspheres near the surface of the products. This is because the heat-expandable microspheres are uniformly blended and distributed in the rubber material.

For manufacturing molded rubber products having good dimensional stability and good appearance, a process of blending expanded hollow resin particles in rubber materials was studied. However, the process failed in manufacturing effectively light weight products due to breakage of the hollow particles in a kneading process of blending the hollow particles with the base rubber.

[PTL 1] Japanese Patent Application Publication 1998-174601

[PTL 2] Japanese Patent Application Publication 2011-256223

SUMMARY OF THE INVENTION

An object of the present invention is to provide a rubber composition for vulcanization molding, which can be manufactured into a rubber product having good dimensional stability, good appearance and effectively light weight, a process for manufacturing the same, and applications thereof.

Following diligent study, the present inventors found that a rubber composition for vulcanization molding which contains hollow particles and a base rubber both having specific properties can be manufactured into rubber products of light weight, good dimensional stability and good appearance owing to minimized breakage of the hollow particles in kneading process so as to achieve the present invention.

The above object of the present invention has been achieved by providing a rubber composition for vulcanization molding which contains hollow particles and a base rubber, wherein the hollow particles are composed of a thermoplastic resin shell and a thermally vaporizable blowing agent encapsulated therein and have a further expansion ratio ranging from 20 to 80% as defined by the following formula (1), and the base rubber has a Mooney viscosity ML (1+4) ranging from 5 to 90 at 100° C. which is measured according to JIS K6300-1 (2013).

$$\text{Further expansion ratio (\%)} = (1 - d_2/d_1) \times 100 \quad (1)$$

where $d_2$ is a true specific gravity of the hollow particles in a state of maximum re-expansion by heating at a maximum re-expansion temperature, and $d_1$ is a true specific gravity of the hollow particles before re-expansion.

The rubber composition for vulcanization molding of the present invention preferably satisfies at least one selected from the following requirements 1) to 7).

1) The base rubber contains at least one selected from the group consisting of ethylene-α-olefin-unconjugated diene copolymer rubber, butadiene rubber, styrene-butadiene rubber, natural rubber, isoprene rubber, nitrile rubber, hydrogenated nitrile rubber, butyl rubber, fluorine rubber, silicone rubber, acrylonitrile-butadiene rubber, chloroprene rubber, acrylic rubber, chlorosulfonated polyethylene rubber, chlorinated polyethylene rubber, urethane rubber, isobutylene-isoprene rubber, polysulfide rubber, propylene oxide rubber and epichlorohydrin rubber.

2) The amount of the hollow particles in the rubber composition for vulcanization molding ranges from 0.1 to 30 wt % and the amount of the base rubber in the rubber composition for vulcanization molding ranges from 10 to 95 wt %.

3) The thermoplastic resin is obtained by polymerizing a polymerizable component containing a nitrile monomer.

4) The polymerizable component further contains a carboxyl-group-containing monomer.

5) The escape-initiation temperature of the blowing agent from the hollow particles ranges from 110 to 350° C.

6) The mean particle size of the hollow particles ranges from 15 to 100 μm.

7) The hollow particles are further composed of a fine particle coating the outer surface of the shell.

In a second aspect, the present invention provides a process for manufacturing a rubber composition for vulcanization molding which includes (I) manufacturing hollow particles composed of thermoplastic resin shell and a thermally vaporizable blowing agent encapsulated therein and having a further expansion ratio ranging from 20 to 80% as defined by the formula (1) above; and (II) kneading a composition containing at least one ingredient selected from the group consisting of the hollow particles manufactured by the process (I) and a masterbatch containing the hollow particles and a liquid organic compound and/or an organic base material, and a base rubber having a Mooney viscosity ML (1+4) ranging from 5 to 90 at 100° C. measured according to JIS K6300-1 (2013).

In yet another aspect, the present invention provides hollow particles used for manufacturing a rubber composition for vulcanization molding containing a base rubber, wherein the base rubber have a Mooney viscosity ML (1+4) ranging from 5 to 90 at 100° C. measured according to JIS K6300-1 (2013). The hollow particles are composed of a thermoplastic resin shell and a thermally vaporizable blowing agent encapsulated therein, and have a further expansion ratio ranging from 20 to 80% as defined by the formula (1) above.

In yet another aspect, the prevent invention provides a masterbatch which contains the above-described hollow particles and a liquid organic compound and/or an organic base material.

In yet another aspect, the present invention provides a rubber product manufactured from the rubber composition for vulcanization molding. The rubber product is preferably a weather-strip, a rubber blanket for printing, an automotive water hose, an air hose, a roofing sheet, wire covering and a shoe sole.

Effects of Invention

The rubber composition for vulcanization molding of the present invention enables the manufacture of rubber products having good dimensional stability, good appearance and effectively light weight.

The process for manufacturing the rubber composition for vulcanization molding of the present invention efficiently manufactures the rubber composition for vulcanization molding which enables the manufacture of rubber products having good dimensional stability, good appearance and effectively light weight.

The rubber product of the present invention, which is manufactured from the rubber composition for vulcanization molding of the present invention, has good dimensional stability, good appearance and light weight.

REFERENCE SYMBOLS LIST

Figure 1:
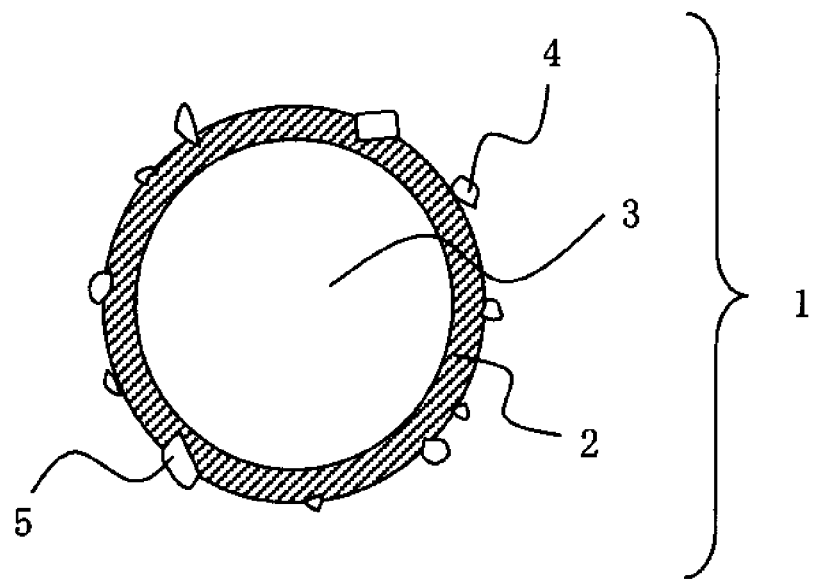
FIG. 1 is a schematic diagram of an example of the fine-particle-coated hollow particles.

Reference symbols used to identify various features in the drawings include the following.

| 1 | Fine-particle-coated hollow particles |
| 2 | Shell |
| 3 | Hollow part |
| 4 | Fine particle (in a state of adhesion) |
| 5 | Fine particle (in a state of fixation in a dent) |
| 8 | Hot air nozzle |
| 9 | Refrigerant flow |
| 10 | Overheat protection jacket |
| 11 | Distribution nozzle |
| 12 | Collision plate |
| 13 | Gas fluid containing heat-expandable microspheres |
| 14 | Gas flow |
| 15 | Hot airflow |

DETAILED DESCRIPTION OF THE PREFERRED EMBODIMENTS

The rubber composition for vulcanization molding of the present invention essentially contains the hollow particles and base rubber. Those components are described in detail as follows. However, the present invention should not be construed as being limited thereto.

Hollow Particles

The hollow particles are an essential component of the rubber composition for vulcanization molding of the present invention. The hollow particles are expandable hollow particles which are composed of a thermoplastic resin shell and a thermally vaporizable blowing agent encapsulated therein, and have a further expansion ratio ranging from 20 to 80% as defined by the following formula (1).

Specifically, the hollow particles are manufactured by heating and expanding heat-expandable microspheres which are composed of a thermoplastic resin shell and a thermally vaporizable blowing agent encapsulated therein. Thus, each of the hollow particles is constituted of thermoplastic resin shell and a hollow part surrounded by the shell. The hollow particles contain a hollow part which is comparatively large and contacts the inner surface of the shell. The hollow part is basically filled with the vapor from the blowing agent and a part of the blowing agent can remain in a liquid state. Furthermore, all or part of the blowing agent can be substituted with the air or other gases. The hollow particles preferably contain one large hollow part, though a plurality of hollow parts can exist in a single hollow particle.

The hollow particles of the present invention can be further composed of a fine particle coating the outer surface of the shell and subjected to treatment including wetting with a liquid organic compound or aging. Those additional components or treatment can be optionally employed. The hollow particles composed of a fine particle coating the outer surface of the shell are referred to as "fine-particle-coated hollow particles", the hollow particles wet with a liquid organic compound are referred to as "wet hollow particles", and the hollow particles subjected to aging are referred to as "aged hollow particles". The hollow particles composed of such additional components including the fine particle and liquid organic compound are referred to as complex hollow particles and are distinguished from simple hollow particles. The processes for manufacturing each of the hollow particles mentioned above including the complex hollow particles are described in detail below.

The hollow particles without the additional components and aging are referred to as the hollow particles a)1, and the fine-particle-coated hollow particles without aging are referred to as the hollow particles a)2. The hollow particles a)1 and a)2 which are wet with a liquid organic compound and are not aged are referred to as the hollow particles a)3 and a)4 respectively. The hollow particles a)1 to a)4 after aging are referred to as the hollow particles A1 to A4. The hollow particles a)1 to a)4 without aging can be collectively referred to as the hollow particles, and the hollow particles A1 to A4 after aging are collectively referred to as the hollow particles A.

The hollow particles are expandable hollow particles having a further expansion performance. The further expansion performance of the hollow particles herein means the further expansion performance (re-expandability) of the hollow particles by heating.

The further expansion ratio of the hollow particles usually ranges from 20 to 80% and preferably ranges from 25 to 75%, more preferably from 30 to 70%, further more preferably from 35 to 65% and most preferably from 40 to 60%. Hollow particles having a further expansion ratio less than 20% can be broken by external force applied to the hollow particles in kneading with a base rubber, etc., and cannot be manufactured into a product with the intended light weight. In conventional processes, hollow particles expanded to a state with almost no further expansion ratio usually have been blended with a rubber composition in order to maximize the lightweight effect by the hollow particles. Such hollow particles, however, have often been broken in the kneading process and have failed to attain intended lightweight effect. The inventors of the present invention found that the object of the present invention can be achieved by controlling the expansion degree of the hollow particles to be lower than that of the hollow particles used in conventional processes and increasing the further expansion ratio of the hollow particles to 20% or more. On the other hand, hollow particles having a further expansion ratio higher than 80% can cause poor dimensional stability and poor appearance of rubber products due to excessive expansion of the hollow particles by the heat history through the processes of rubber molding, though the hollow particles are not often broken in kneading process. Heat-expandable microspheres before thermal expansion have a further expansion ratio higher than about 95%.

The further expansion ratio indicates the potential of hollow particles to re-expand to the state of their maximum re-expansion, and can be calculated from the true specific gravity of the hollow particles before re-expansion ($d_1$) and the true specific gravity of the hollow particles in the state of their maximum re-expansion ($d_2$) by the following formula.

Further expansion ratio (%)=$(1-d_2/d_1) \times 100$     (1)

The further expansion ratio of the complex hollow particles is calculated from the true specific gravity of the hollow particles alone excluding the additional components. For example, the further expansion ratio of the "fine-particle-coated hollow particles" is calculated from the true specific gravities of the hollow particles alone before re-expansion, $d_1$, and in the state of maximum expansion, $d_2$, by the formula (1). The true specific gravity of the hollow particles alone (without the fine particles) is calculated from the weight fraction of the fine particles and hollow particles alone in the "fine-particle-coated hollow particles" and the true specific gravities of the "fine-particle-coated hollow particles" and the fine particles. The details of the calculation of the true specific gravities is described in the Example.

The hollow particles should preferably have a re-expansion initiation temperature ($T_{s2}$). The re-expansion initiation temperature ($T_{s2}$) of the hollow particles is not specifically restricted, and preferably ranges from 100 to 210° C., more preferably from 105 to 200° C., further more preferably from 110 to 190° C. and most preferably from 120 to 180° C. The hollow particles having a re-expansion initiation temperature ($T_{s2}$) lower than 100° C. can be partially expanded by the heat history which the hollow particles receive before molding rubber products to cause poor dimensional stability and poor appearance of resultant rubber products. On the other hand, the hollow particles having a re-expansion initiation temperature ($T_{s2}$) higher than 210° C. can be dented when the rubber composition for vulcanization molding is molded under pressure. This is because the internal pressure of the hollow particles generated by the vapor of the encapsulated blowing agent cannot resist the external pressure given to the hollow particles. Then the volume of the molded products containing the dented hollow particles can decrease with the advancement of vulcanization to cause poor dimensional stability of the rubber products.

The hollow particles preferably have a maximum re-expansion temperature ($T_{max2}$). The maximum re-expansion temperature ($T_{max2}$) of the hollow particles is not specifically restricted, and preferably ranges from 90 to 370° C., more preferably from 110 to 330° C., further more preferably from 140 to 300° C. and most preferably from 160 to 250° C. Hollow particles having a maximum re-expansion temperature ($T_{max2}$) lower than 90° C. have insufficient heat resistance and can shrink in the vulcanization process of the rubber composition to fail to achieve an effectively light weight. On the other hand, the hollow particles having a maximum re-expansion temperature ($T_{max2}$) higher than 370° C. cannot be lightweight hollow particles.

The relation between the re-expansion initiation temperature ($T_{s2}$) of the hollow particles and the temperature in kneading process ($T_a$) is not specifically restricted, and preferably meets the relation of 30° C.<$T_a$<$T_{s2}$ and more preferably 50° C.<$T_a$<($T_{s2}$−10° C.) If $T_a$ is 30° C. or lower, the internal pressure of the hollow particles remains lower than desirable level leading to low pressure resistance of the hollow particles and can cause the breakage of the hollow particles in a kneading process. The temperature in the kneading process ($T_a$) means the temperature of the process in which a composition containing the hollow particles and a base rubber is kneaded into a rubber composition for vulcanization molding.

The relation between the re-expansion initiation temperature ($T_{s2}$) of the hollow particles and the temperature in vulcanization molding process ($T_b$) is not specifically restricted, and preferably meets the relation of 80° C.<$T_b$<($T_{s2}$+50° C.) and more preferably 100° C.<$T_b$<($T_{s2}$+35° C.) If $T_b$ is 80° C. or lower, the vulcanization rate of the base rubber slows and the rubber can be insufficiently vulcanized. On the other hand, if $T_b$ meets the relation of ($T_{s2}$+50° C.)≤$T_b$, the hollow particles can expand during the vulcanization molding. The temperature in the vulcanization molding process ($T_b$) means the temperature of the process in which a rubber composition for vulcanization molding containing the hollow particles and a base rubber is vulcanized and molded. The vulcanization molding performed under a suitable molding pressure can mold the rubber composition for vulcanization molding without expansion or breakage of the hollow particles having a further expansion ratio ranging from 20 to 80%, even if $T_b$ meets the relation of $T_{s2}$≤$T_b$<($T_{s2}$+50° C.). The molding pressure in the vulcanization molding is variable depending on the molding process and is not specifically restricted, though the molding pressure is preferably higher than the vapor pressure of the blowing agent encapsulated in hollow particles at the temperature $T_b$. The upper limit of the molding pressure is 300 MPa, and the lower limit is 0.1 MPa.

The true specific gravity of the hollow particles ($d_1$) is not specifically restricted and preferably ranges from 0.02 to 0.4, more preferably from 0.03 to 0.35, further more preferably from 0.035 to 0.30, yet further more preferably from 0.04 to 0.25 and most preferably from 0.045 to 0.20. The hollow particles having a true specific gravity ($d_1$) lower than 0.02 have low shear resistance and can partially break in the kneading process. In addition, such hollow particles have a low pressure resistance and can be dented by external pressure applied to the hollow particles while the rubber composition for vulcanization molding is molded, and the volume of the molded products containing the dented hollow particles can decrease with the advancement of vulcanization to cause poor dimensional stability of the rubber products. On the other hand, hollow particles having a true specific gravity ($d_1$) higher than 0.4 can fail to attain sufficient lightweight effect.

The mean particle size of the hollow particles, D50, is not specifically restricted and preferably ranges from 15 to 100 µm, more preferably from 25 to 85 µm, further more preferably from 30 to 70 µm, and most preferably from 35 to 60 µm. The hollow particles having a mean particle size less than 15 µm have a thin shell which results in a low pressure resistance of the hollow particles. Such hollow particles are dented by the external pressure applied to the hollow particles while the rubber composition for vulcanization molding is molded, and the volume of the molded products containing the dented hollow particles can decrease with the advancement of vulcanization to cause poor dimensional stability of the rubber products. On the other hand, the hollow particles having a mean particle size greater than 100 µm have a low shear resistance, and can partially break in a kneading process to fail to attain an intended lightweight product. Furthermore, the large particle size of such hollow particles can cause poor appearance of the resultant rubber products.

The mean thickness of the shell of the hollow particles is not specifically restricted, and preferably ranges from 0.1 to 3 µm, more preferably from 0.2 to 2.5 µm, further more preferably from 0.3 to 2.0 µm, and most preferably from 0.5 to 1.5 µm. The hollow particles having a shell of a mean thickness lower than 0.1 µm have a low pressure resistance to denting by external pressure applied to the hollow particles while the rubber composition for vulcanization molding is molded, and the volume of the molded products containing the dented hollow particles can decrease with the advancement of vulcanization to cause poor dimensional stability of the rubber products. On the other hand, the hollow particles having a shell of a mean thickness higher than 3 µm can fail to achieve a sufficient lightweight effect of the resultant rubber products.

The ratio, K, of the mean thickness of the shell of the hollow particles to the mean particle size of the hollow particles, D50, [being represented by the formula, K (%)=100×(mean thickness of the shell of the hollow particles)/(mean particle size of the hollow particles, D50)(%)], is not specifically restricted, and preferably ranges from 0.1 to 8.0%, more preferably from 0.2 to 5.0%, further more preferably from 0.25 to 4.0%, and most preferably from 0.3 to 3.0%. The hollow particles having K (the ratio of the mean thickness of the shell of the hollow particles to the mean particle size of the hollow particles, D50) lower than 0.1% have poor shear resistance and can partially break in a kneading process.

On the other hand, the hollow particles having K (the ratio of the mean thickness of the shell of the hollow particles to the mean particle size of the hollow particles, D50) higher than 8.0% have an excessive volume of the shell to the volume of the hollow particles, and can fail to attain a sufficient lightweight effect of the resultant rubber products. The calculation for the K is described in detail in the Example.

The moisture content of the hollow particles is not specifically restricted, and is preferably be not higher than 3 wt %, more preferably not higher than 2 wt %, further more preferably not higher than 1.5 wt % and most preferably not higher than 0.8 wt %. The lower limit of the moisture content of the hollow particles is 0 wt %. The hollow particles having a moisture content higher than 3 wt % can make voids in rubber products.

The encapsulation ratio of the blowing agent in the hollow particles ($C_2$) is preferably at least 5 wt %, more preferably at least 8 wt %, further more preferably at least 12 wt % and most preferably at least 15 wt %. The hollow particles having an encapsulation ratio lower than 5 wt % can have insufficient pressure resistance due to low internal pressure by the blowing agent. The desirable upper limit of the encapsulation ratio is 30 wt %. The hollow particles having an encapsulation ratio higher than 30 wt % have a thin shell which can decrease the strength of the hollow particles or make the blowing agent easily escape from the hollow particles. The encapsulation ratio of the blowing agent of the hollow particles mentioned herein means the ratio by weight of the blowing agent to the hollow particles. In the case of hollow particles composed of other materials in addition to the shell and the blowing agent, the encapsulation ratio means the weight fraction of the blowing agent to the hollow particles alone without other substances.

The retention ratio of the blowing agent in the hollow particles is preferably at least 60%, more preferably at least 70%, further more preferably at least 75 wt %, and most preferably at least 80%. Hollow particles having a retention ratio of the blowing agent of less than 60% have a low internal pressure and a shell of low density which can cause poor pressure resistance of the hollow particles to make the hollow particles break easily. The retention ratio of the blowing agent in the hollow particles mentioned herein is the ratio of the encapsulation ratio of the blowing agent in heat-expandable microspheres before thermal expansion (C1) to the encapsulation ratio of the blowing agent in the hollow particles manufactured by thermal expansion of the heat-expandable microspheres (C2) (the retention ratio of the blowing agent in hollow particles (%)=100(%)×$C_2/C_1$)). The measuring method for the retention ratio of a blowing agent in hollow particles is described in the Example.

The escape-initiation temperature of the blowing agent ($T_R$) from the hollow particles is not specifically restricted, and preferably ranges from 110 to 350° C., more preferably from 120 to 300° C., further more preferably from 130 to 250° C., yet further more preferably from 140 to 220° C. and most preferably from 150 to 200° C. Hollow particles having an escape-initiation temperature of the blowing agent ($T_R$) that is lower than 110° C. can generate voids in a rubber composition due to escape of the blowing agent during vulcanization molding and cause poor appearance of the resultant rubber products. On the other hand, hollow particles having an escape-initiation temperature of the blowing agent ($T_R$) that is higher than 350° C. can result in disintegration of the shell. The escape-initiation temperature of the blowing agent ($T_R$) from the hollow particles is measured in the procedure described in the Example.

Process for Manufacturing the Hollow Particles

The process for manufacturing the hollow particles includes the process (1) for producing heat-expandable microspheres composed of a thermoplastic resin shell and a thermally vaporizable blowing agent encapsulated therein, and the process (2) for thermally expanding the heat-expandable microspheres produced in the process (1) to obtain hollow particles. The process (1) is referred to as the polymerization process and the process (2) is referred to as the expansion process.

Polymerization Process

The polymerization process means the process (1) for producing heat-expandable microspheres composed of a thermoplastic resin shell and a thermally vaporizable blowing agent encapsulated therein. The polymerization process includes a process in which an oily mixture containing a polymerizable component and blowing agent is dispersed in an aqueous dispersion medium and the polymerizable component is polymerized.

The polymerizable component is polymerized into a thermoplastic resin which constitutes the shell of the heat-expandable microspheres. The polymerizable component essentially contains a monomer component and can optionally contain a cross-linking agent.

The monomer component is generally referred to as a (radically) polymerizable monomer having a polymerizable double bond.

The polymerizable component preferably contains a nitrile monomer. A resin obtained by polymerizing a polymerizable component containing a nitrile monomer (the polymer of a polymerizable component containing a nitrile monomer) is preferable for the thermoplastic resin constituting the shell of the hollow particles. The shell of such resin retains the blowing agent encapsulated in the hollow particles to prevent escape of the blowing agent and keeps the internal pressure of the hollow particles high during the molding operation, and thus prevents denting of the hollow particles by the external molding pressure to contribute to manufacture of a rubber composition for vulcanization molding which can be processed into products of better dimensional stability.

The nitrile monomer includes, for example, acrylonitrile (AN), methacrylonitrile (MAN), α-chloroacrylonitrile, α-ethoxyacrylonitrile and fumaronitrile.

The amount of the nitrile monomer in the polymerizable component is not specifically restricted, and is preferably at least 40 wt %, more preferably at least 60 wt %, further more preferably at least 75 wt %, or preferably is not higher than 100 wt %, more preferably not higher than 95 wt %, and further more preferably not higher than 85 wt %. An amount of the nitrile monomer of less than 40 wt % can deteriorate the performance of the resultant shell to retain the blowing agent and cause escape of the blowing agent and decreased internal pressure of the hollow particles to make the hollow particles prone to denting. Such hollow particles can result in poor dimensional stability of the rubber products manufactured by molding the rubber composition for vulcanization molding.

The amount of the methacrylonitrile monomer in the nitrile monomer preferably ranges from 5 to 90 wt %, more preferably from 10 to 80 wt %, further more preferably from 20 to 75 wt %, and most preferably from 30 to 60 wt %. An amount of methacrylonitrile monomer within the above range improves the film forming performance of the resultant thermoplastic resin to improve the density of the shell and allow the hollow particles to well retain the blowing agent and have high pressure resistance. Such hollow particles contribute to manufacture of the rubber composition for vulcanization molding and molded rubber products with a high lightweight effect and better dimensional stability.

The nitrile monomer preferably contains acrylonitrile (AN) and methacrylonitrile (MAN) to improve the performance of the resultant shell to retain the blowing agent encapsulated in the heat-expandable microspheres and hollow particles manufactured therefrom. Such hollow particles contribute to manufacture of a rubber composition for vulcanization molding and molded rubber products of better dimensional stability.

The polymerizable component can contain a monomer other than the nitrile monomer. The monomer other than the nitrile monomer is not specifically restricted, and includes, for example, vinyl halide monomers, such as vinyl chloride; vinylidene halide monomers, such as vinylidene chloride; vinyl ester monomers, such as vinyl acetate, vinyl propionate and vinyl butyrate; carboxyl-group-containing monomers such as (meth) acrylic acid, ethacrylic acid, crotonic acid and cinnamic acid; carboxylic anhydride monomers, such as maleic acid, itaconic acid and fumaric acid; (meth) acrylate monomers, such as methyl (meth)acrylate, ethyl (meth)acrylate, n-butyl (meth)acrylate, t-butyl (meth)acrylate, 2-ethylhexyl (meth)acrylate, stearyl (meth)acrylate, phenyl (meth)acrylate, isobornyl (meth)acrylate, cyclohexyl (meth)acrylate, benzyl (meth)acrylate, and 2-hydroxyethyl (meth)acrylate; (meth)acrylamide monomers, such as acrylamide, substituted acrylamide, methacrylamide and substituted methacrylamide; maleimide monomers, such as N-phenyl maleimide and N-cyclohexyl maleimide; styrene monomers, such as styrene and α-methyl styrene; ethylenically unsaturated monoolefin monomers, such as ethylene, propylene, and isobutylene; vinyl ether monomers, such as vinyl methyl ether, vinyl ethyl ether and vinyl isobutyl ether; vinyl ketone monomers, such as vinyl methyl ketone; N-vinyl monomers, such as N-vinyl carbazole and N-vinyl pyrolidone; and vinyl naphthalene salts. The term, "(meth) acryl", means acryl or methacryl. One of or a combination of at least two of those monomers can be employed.

The polymerizable component containing a carboxyl-group-containing monomer is preferable to attain excellent heat resistance of the resultant hollow particles and to enable molding the rubber composition for vulcanization molding advantageously at high temperature. The carboxyl-group-containing monomer is not specifically restricted, and includes unsaturated monocarboxylic acids, such as acrylic acid, methacrylic acid, ethacrylic acid, crotonic acid and cinnamic acid; unsaturated dicarboxylic acids, such as maleic acid, itaconic acid, fumaric acid, citraconic acid and chloromaleic acid; anhydrides of unsaturated dicarboxylic acids; and monoesters of unsaturated dicarboxylic acids, such as monomethyl maleate, monoethyl maleate, monomethyl itaconate, monoethyl itaconate and monobutyl itaconate. One of or a combination of at least two of these carboxyl-group-containing monomers can be used. A part of or the whole of the carboxyl groups of the carboxyl-group-containing monomers can be neutralized during or after the polymerization. Of those carboxyl-group-containing monomers mentioned above, acrylic acid, methacrylic acid, maleic acid, maleic acid anhydride and itaconic acid are preferable, acrylic acid and methacrylic acid are more preferable, and methacrylic acid is most preferable for improved heat resistance of the resultant hollow particles. The heat-expandable microspheres produced from the polymerizable component containing a carboxyl-group-containing monomer can be surface-treated with a chemical compound reactive with a carboxyl group. The chemical compound reactive with a carboxyl group is not specifically restricted, and includes, for example, metal-containing organic compounds, epoxy resins and silane coupling agents.

The amount of the carboxyl-group-containing monomer in the polymerizable component is not specifically restricted, and preferably ranges from 3 to 60 wt % of the polymerizable component, more preferably from 7 to 50 wt %, further more preferably from 10 to 40 wt %, yet further more preferably from 14 to 35 wt %, and most preferably from 20 to 33 wt %. An amount of the carboxyl-group-containing monomer less than 3 wt % cannot be effective to achieve sufficient heat resistance of the resultant hollow particles, and the rubber composition for vulcanization molding cannot be molded advantageously at high temperature. On the other hand, the amount of the carboxyl-group-containing monomer greater than 60 wt % can cause poor gas impermeability of the resultant hollow particles to make the blowing agent escape from the hollow particles and decrease the internal pressure of the hollow particles. Thus the hollow particles fail to achieve the lightweight effect and good dimensional stability of the rubber products manufactured by molding the rubber composition for vulcanization molding.

A polymerizable component containing a carboxyl-group-containing monomer in addition to a nitrile monomer is preferable for high gas barrier property of the shell and high heat resistance of the resultant hollow particles. This enables molding the rubber composition for vulcanization molding advantageously at high-temperature to manufacture molded rubber products of good dimensional stability. For the polymerizable component containing the nitrile monomer and carboxyl-group-containing monomer as essential components, the total amount of those monomers in the polymerizable component is preferably at least 50 wt %, more preferably at least 60 wt %, further more preferably at least 70 wt %, yet further more preferably at least 80 wt % and most preferably at least 90 wt %. In this case, the amount of the carboxyl-group-containing monomer in the total amount of the nitrile monomer and carboxyl-group-containing monomer preferably ranges from 5 to 60 wt %, more preferably from 8 to 50 wt %, further more preferably from 10 to 45 wt %, yet further more preferably from 15 to 40 wt % and most preferably from 20 to 35 wt %.

The polymerizable component can contain a polymerizable monomer having at least two polymerizable double bonds (a cross-linking agent) other than the monomers mentioned above. Polymerization of the polymerizable component with the cross-linking agent can improve the strength of the shell of the hollow particles and prevent breakage of the hollow particles in a kneading process more effectively.

The cross-linking agent is not specifically restricted, and includes, for example, aromatic divinyl compounds, such as divinylbenzene and divinyl naphthalene; and other compounds, such as allyl methacrylate, triacrylformal, triallyl isocyanate, ethylene glycol di(meth)acrylate, diethylene glycol di(meth)acrylate, triethylene glycol di(meth)acrylate, 1,4-butanediol di(meth)acrylate, 1,9-nonanediol di(meth)acrylate, 1,10-decanediol di(meth)acrylate, PEG (200) di(meth)acrylate, PEG (400) di(meth)acrylate, PEG (600) di(meth)acrylate, neopentylglycol di(meth)acrylate, 1,6-hexanediol di(meth)acrylate, trimethylolpropane tri(meth)acrylate, EO-modified trimethylolpropane tri(meth)acrylate, glycerin di(meth)acrylate, dimethylol-tricyclodecane di(meth)acrylate, pentaerythritol tri(meth)acrylate, pentaerythritol tetra(meth)acrylate, dipentaerythritol hexa(meth)acrylate, neopentyl glycol-acrylic-acid-benzoate ester, trimethylol propane-acrylic-acid-benzoate ester, 2-hydroxy-3-acryloiloxylpropyl (meth)acrylate, hydroxypivalic acid neopentylglycol di(meth)acrylate, ditrimethylolpropane tetra(meth)acrylate, 2-butyl-2-ethyl-1,3-propanediol di(meth)acrylate, polytetramethyleneglycol di(meth)acrylate, phenylglycidylether acrylate hexamethylene diisocyanate urethaneprepolymer, phenylglycidylether acrylate toluene diisocyanate urethaneprepolymer, pentaerythritol triacrylate hexamethylene diisocyanate urethaneprepolymer, pentaerythritol triacrylate toluene diisocyanate urethaneprepolymer and pentaerythritol triacrylate isophorone diisocyanate urethaneprepolymer. One of or a combination of at least two of those cross-linking agents can be used.

The amount of the cross-linking agent in the polymerizable component is not specifically restricted and can be 0 wt %. However, the amount preferably ranges from 0.01 to 5 wt %, more preferably from 0.05 to 3 wt %, further more preferably from 0.1 to 1.5 wt % and most preferably from 0.3 to 1 wt % for adjusting the expansion performance of the microspheres and improving the solvent resistance and blowing-agent-retention performance of the microspheres.

The blowing agent is not specifically restricted if it is thermally vaporizable, and includes, for example, $C_3$-$C_{13}$ hydrocarbons such as propane, (iso)butane, (iso)pentane, (iso)hexane, (iso)heptane, (iso)octane, (iso)nonane, (iso)decane, (iso)undecane, (iso)dodecane and (iso)tridecane; hydrocarbons having a carbon number greater than 13 and not greater than 20, such as (iso)hexadecane and (iso)eicosane; hydrocarbons from petroleum fractions such as pseudocumene, petroleum ether, and normal paraffins and isoparaffins having an initial boiling point ranging from 150 to 260° C. and/or being distilled at a temperature ranging from 70 to 360° C.; their halides; fluorine-containing compounds, such as hydrofluoroether; tetramethyl silane; and compounds which thermally decompose to generate gases. One of or a combination of at least two of those blowing agents can be employed. The aforementioned blowing agents can be any of linear, branched or alicyclic compounds, and are preferably aliphatic compounds.

The amount of the blowing agent in the oily mixture is not specifically restricted, and preferably ranges from 5 to 30 wt %, more preferably from 8 to 25 wt % and most preferably from 12 to 23 wt %. An amount of the blowing agent of less than 5 wt % can fail to attain the effect of the blowing agent. On the other hand, an amount of the blowing agent that is greater than 30 wt % results in heat-expandable microspheres having a thin shell which cannot have high expansion performance.

The blowing agent preferably contains a hydrocarbon having a carbon number of at least 4, more preferably a hydrocarbon having a carbon number of at least 5. Above all, the blowing agent containing a hydrocarbon having a carbon number ranging from 5 to 8 is further more preferable for efficiently manufacturing the hollow particles. The blowing agent containing a hydrocarbon having a carbon number of less than 4 easily escapes from the hollow particles and can result in insufficient pressure resistance of the hollow particles.

An amount of the hydrocarbon having a carbon number of at least 5 in the blowing agent is preferably at least 35 wt %, more preferably at least 50 wt % and most preferably at least 70 wt %. A blowing agent containing less than 35 wt % of a hydrocarbon having a carbon number of at least 5 easily escapes from the hollow particles, and can result in insufficient pressure resistance of the hollow particles. The upper limit of the amount of the hydrocarbon having a carbon number of at least 5 is 100 wt %.

The polymerizable component is preferably polymerized in the presence of a polymerization initiator, and the oily mixture preferably contains the polymerization initiator.

The polymerization initiator is not specifically restricted, and includes peroxides and azo compounds.

The peroxides include, for example, peroxidicarbonates, such as diisopropyl peroxydicarbonate, di-sec-butyl peroxydicarbonate, di-2-ethylhexyl peroxydicarbonate, di-2-octyl peroxydicarbonate and dibenzyl peroxydicarbonate; peroxyesters, such as t-butyl peroxypivalate, t-hexyl peroxypivalate, 1-cyclohexyl-1-methylethyl peroxyneodecanoate and t-butyl peroxy 3,5,5-trimethyl hexanoate; and diacyl peroxides, such as isobutyryl peroxide, 3,5,5-trimethyl hexanoyl peroxide, octanoyl peroxide, caproyl peroxide, stearoyl peroxide, lauroyl peroxide and benzoyl peroxide.

The azo compound includes, for example, 2,2'-azobis(4-methoxy-2,4-dimethyl valeronitrile), 2,2'-azobisisobutylonitrile, 2,2'-azobis(2,4-dimethyl valeronitrile), 2,2'-azobis(2-methyl propionate) and 2,2'-azobis(2-methyl butylonitrile).

One of or a combination of at least two of the polymerization initiators can be employed. The polymerization initiator is preferably an oil-soluble polymerization initiator which is soluble in the monomer component.

The amount of the polymerization initiator is not specifically restricted, and preferably ranges from 0.3 to 8 parts by weight to 100 parts by weight of the polymerizable component.

In the polymerization process, the oily mixture can further contain a chain transfer agent.

The aqueous dispersion medium contains water, such as deionized water, as a main component, and the oily mixture is dispersed therein. The aqueous dispersion medium can further contain alcohols, such as methanol, ethanol and propanol, and hydrophilic organic solvents, such as acetone. The hydrophilic property mentioned in the present invention means the property of a substance optionally miscible in water. The amount of the aqueous dispersion medium used in the process is not specifically restricted, and preferably ranges from 100 to 1000 parts by weight to 100 parts by weight of the polymerizable component.

The aqueous dispersion medium can further contain an electrolyte, such as sodium chloride, magnesium chloride, calcium chloride, sodium sulfate, magnesium sulfate, ammonium sulfate, and sodium hydroxide. One of or a combination of at least two of these electrolyte can be used. The amount of the electrolyte is not specifically restricted, and preferably ranges from 0 to 50 parts by weight to 100 parts by weight of the aqueous dispersion medium.

The aqueous dispersion medium can contain at least one water-soluble compound selected from the group consisting of polyalkylene imines having a MW of at least 1000 having at least one bond of nitrogen atom and an alkyl group substituted with a hydrophilic functional group selected from the group consisting of carboxylic acid (salt) groups and phosphonic acid (salt) groups, and water-soluble 1,1-substitution compounds having a carbon atom bonded with a hetero atom and with a hydrophilic functional group selected from the group consisting of hydroxyl group, carboxylic acid (salt) groups and phosphonic acid (salt) groups, potassium dichromate, alkali metal nitrite salts, metal (III) halides, boric acid, water-soluble ascorbic acids, water-soluble polyphenols, water-soluble vitamin Bs, water-soluble phosphonic acids and phosphonate salts. The term "water-soluble" in the present invention means that at least 1 g of a substance is soluble in 100 g of water at 25° C.

The amount of the water-soluble compound contained in the aqueous dispersion medium is not specifically restricted, and preferably ranges from 0.0001 to 1.0 part by weight to 100 parts by weight of the polymerizable component, more preferably from 0.0003 to 0.1 parts by weight, and most preferably from 0.001 to 0.05 parts by weight. An insufficient amount of the water-soluble compound can fail to exert sufficient effect by the water-soluble compound. On the other hand, an excessive amount of the water-soluble compound can decrease the polymerization rate or increase the amount of the residue from the polymerizable component which is the raw material of the microspheres.

The aqueous dispersion medium can contain a dispersion stabilizer or dispersion stabilizing auxiliary in addition to the electrolytes and water-soluble compounds.

The dispersion stabilizer is not specifically restricted, and includes, for example, calcium triphosphate; magnesium pyrophosphate and calcium pyrophosphate produced by double reaction; colloidal silica; alumina sol; magnesium hydroxide; aluminum hydroxide, ferric hydroxide, barium sulfate, calcium sulfate, sodium sulfate, calcium oxalate, calcium carbonate, barium carbonate and magnesium carbonate. One of or a combination of at least two of those dispersion stabilizers can be used. The amount of the dispersion stabilizer preferably ranges from 0.1 to 20 parts by weight to 100 parts by weight of the polymerizable component, more preferably from 0.5 to 10 parts by weight, further more preferably from 0.7 to 7 parts by weight and most preferably from 1 to 5 parts by weight.

The dispersion stabilizing auxiliary is not specifically restricted, and includes, for example, polymeric dispersion stabilizing auxiliaries; and surfactants, such as cationic surfactants, anionic surfactants, amphoteric surfactants and nonionic surfactants. One of or a combination of at least two of those dispersion stabilizing auxiliaries can be used, and is selected by taking into consideration of the particle size of the resultant heat-expandable microspheres and the dispersion stability of the components in the polymerization.

The polymeric dispersion stabilizing auxiliaries include, for example, a condensation product of diethanol amine and an aliphatic dicarboxylic acid, gelatin, polyvinyl pyrolidone, methyl cellulose, polyethylene oxides and polyvinyl alcohols.

The amount of the polymeric dispersion stabilizing auxiliaries is not specifically restricted, and should preferably range from 0.0001 to 5 parts by weight to 100 parts by weight of the polymerizable component, and more preferably from 0.0003 to 2 parts by weight.

The aqueous dispersion medium is prepared, for example, by blending an electrolyte, water-soluble compounds, dispersion stabilizers and dispersion stabilizing auxiliaries, which are selected optionally, with water, such as deionized water. The pH of the aqueous dispersion medium in the polymerization is adjusted according to the water-soluble compounds, dispersion stabilizers and dispersion stabilizing auxiliaries. For the aqueous dispersion medium containing colloidal silica as the dispersion stabilizer, the pH in the polymerization should preferably ranges from 2 to 7, more preferably from 2.2 to 6, further more preferably from 2.3 to 4, and most preferably from 2.5 to 3.5.

In the polymerization step, the oily mixture is dispersed and suspended in the aqueous dispersion medium to be formed into oil globules of a prescribed particle size.

The methods for dispersing and suspending the oily mixture include generally known dispersion methods, such as agitation with a Homo-mixer (for example, a device manufactured by Primix Corporation), dispersion with a static dispersing apparatus such as a Static mixer (for example, a device manufactured by Noritake Engineering Co., Ltd.), membrane emulsification technique, ultrasonic dispersion, and micro-channel dispersion.

Then suspension polymerization is started by heating the dispersion in which the oily mixture is dispersed into oil globules in the aqueous dispersion medium. During the polymerization reaction, the dispersion is preferably agitated gently to prevent the floating of monomers and sedimentation of polymerized heat-expandable microspheres.

The polymerization temperature can be settled optionally depending on the variant of the polymerization initiator, and is preferably controlled within the range from 30 to 100° C., more preferably from 40 to 90° C., further more preferably from 45 to 85° C., and most preferably from 50 to 80° C. The polymerization temperature is preferably maintained for about 0.1 to 20 hours. The initial pressure for the polymerization is not specifically restricted, and is preferably controlled within the range from 0 to 5.0 MPa in gauge pressure, and more preferably from 0.1 to 3.0 MPa.

The mean particle size, D50, of the heat-expandable microspheres produced in the polymerization is not specifically restricted and preferably ranges from 1 to 60 µm, more preferably from 3 to 50 µm, further more preferably from 5 to 40 µm, yet further more preferably from 8 to 30 µm and most preferably from 10 to 25 µm. Heat-expandable microspheres having a mean particle size, D50, less than 1 µm have low expansion performance and fail to be manufactured into the intended hollow particles. On the other hand, heat-expandable microspheres having a mean particle size, D50, greater than 60 µm can be thermally expanded into hollow particles having an excessively large mean particle size to cause poor appearance of the resultant rubber products.

The coefficient of variation, CV, of the particle size distribution of the heat-expandable microspheres produced in the polymerization step is not specifically restricted, and is preferably not greater than 35%, more preferably not greater than 30%, and most preferably not greater than 25%. The CV can be calculated by the following formula (2) and (3).

$$CV = (s/\langle x \rangle) \times 100 \, (\%) \quad (2)$$

$$s = \left\{ \sum_{i=1}^{n} (xi - \langle x \rangle)^2 / (n-1) \right\}^{1/2} \quad (3)$$

(where s is a standard deviation of the particle size of the microspheres, $\langle x \rangle$ is a mean particle size of the microspheres, "xi" is the particle size of the i-th particle, and n represents the number of particles)

The expansion-initiation temperature ($T_{s1}$) of the heat-expandable microspheres produced in the polymerization step is not specifically restricted, and preferably ranges from 80 to 250° C., more preferably from 100 to 240° C., further more preferably from 110 to 230° C., yet further more preferably from 120 to 220° C., and most preferably from 130 to 210° C. Heat-expandable microspheres having an expansion-initiation temperature lower than 80° C. can be thermally expanded into hollow particles which further expand before rubber products are molded and cause poor dimensional stability of the rubber products. On the other hand, heat-expandable microspheres having an expansion initiation temperature higher than 250° C. have excessive heat resistance which can cause difficulty in manufacturing the hollow particles.

The maximum expansion temperature ($T_{max1}$) of the heat-expandable microspheres produced in the polymerization step is not specifically restricted, and preferably ranges from 110 to 350° C., more preferably from 130 to 330° C., further more preferably from 150 to 300° C., yet further more preferably from 160 to 270° C., and most preferably from 170 to 230° C. Heat-expandable microspheres having a maximum expansion temperature ($T_{max1}$) lower than 110° C. can be manufactured into hollow particles which shrink and decrease their volume before rubber products are molded, and can fail to achieve a lightweight effect or cause poor dimensional stability of the rubber products. On the other hand, heat-expandable microspheres having a maximum expansion temperature ($T_{max1}$) higher than 350° C. have excessive heat resistance and can cause difficulty in manufacturing hollow particles.

The encapsulation ratio of the blowing agent ($C_1$) in the heat-expandable microspheres produced in the polymerization step is defined as the weight percentage of the blowing agent encapsulated in heat-expandable microspheres to the weight of the heat-expandable microspheres. The encapsulation ratio of the blowing agent in heat-expandable microspheres is not specifically restricted, and preferably ranges from 5 to 30 wt %, more preferably from 8 to 25 wt %, and most preferably from 12 to 23 wt %. An encapsulation ratio of the blowing agent less than 5 wt % can lead to insufficient effect by the blowing agent. On the other hand, an encapsulation ratio of the blowing agent higher than 30 wt % can excessively thin the shell of heat-expandable microspheres to make the blowing agent escape through the shell and decrease the expansion performance of the microspheres.

Expansion Process

The expansion process means the process (2) in which the heat-expandable microspheres produced in the process (1) is thermally expanded into hollow particles. The process for the expansion is not specifically restricted if the heat-expandable microspheres can be thermally expanded, and either dry thermal expansion or wet thermal expansion can be employed, though dry thermal expansion is preferable for the present invention to save the step of drying the microspheres.

An example of the dry thermal expansion is the process disclosed in U.S. Patent Application Publication 2007-0154711 (Japanese Patent Application Publication 2006-213930) incorporated herein by reference, in particular the internal injection process. Another example of the dry thermal expansion is the process disclosed in Japanese Patent Application Publication 2006-96963 incorporated herein by reference. An example of the wet thermal expansion is the process disclosed in Japanese Patent Application Publication 1987-201231 incorporated herein by reference.

A preferable temperature for thermally expanding the heat-expandable microspheres ranges from 100 to 450° C.

Process for Manufacturing the Hollow Particles a)1

The process for manufacturing the hollow particles a)1 by dry thermal expansion includes the steps of introducing the gas fluid containing the heat-expandable microspheres produced in the process (1) into a gas inlet tube having a distribution nozzle at the outlet and placed inside of hot airflow and injecting the gas fluid from the distribution nozzle (injection step); making the gas fluid collide with a collision plate placed below the distribution nozzle to distribute the heat-expandable microspheres in the hot airflow (distribution step); and heating and expanding the distributed heat-expandable microspheres in the hot airflow at a temperature higher than the expansion initiation temperature of the heat-expandable microspheres (expansion step).

In the above-mentioned process, the hollow particles a)1 having a further expansion ratio ranging from 20 to 80% are manufactured by properly modifying the manufacturing condition.

Process for Manufacturing the Hollow Particles a)2

The process for manufacturing the hollow particles a)2 includes the above-mentioned process (1) for producing heat-expandable microspheres; the process for mixing the heat-expandable microspheres with a fine particle (mixing process); and the process for heating the mixture prepared in the mixing process at a temperature higher than the softening point of the thermoplastic resin constituting the shell of the heat-expandable microspheres to expand the heat-expandable microspheres (corresponding to the process (2) mentioned above) and simultaneously coat the outer surface of the shell of the microspheres with the fine particle (coating process).

In the mixing process, the heat-expandable microspheres and a fine particle are mixed.

The ratio by weight of the fine particle to the heat-expandable microspheres in the mixing process is not specifically restricted, and preferably ranges from 90:10 to 60:40, more preferably from 85:15 to 65:35, and most preferably from 80:20 to 70:30. The ratio by weight of the fine particle to the heat-expandable microspheres higher than 90:10 results in high true specific gravity of the resultant hollow particles a)2 and can decrease the lightweight effect by the hollow particles. On the other hand, the ratio by weight of the fine particle to the heat-expandable microspheres lower than 60:40 results in low true specific gravity of the resultant hollow particles a)2 and can deteriorate the handling property of the microspheres to cause troubles such as dusting.

The device used for the mixing is not specifically restricted, and a quite simple device, such as a combination of a vessel and stirring paddle, can be used. A common type of powder mixer which shakes and agitates powder can be used. Such powder mixers include a ribbon mixer and vertical screw mixer which can shake or agitate powder materials. Recently available are high-efficiency multifunctional powder mixers manufactured by combining a plurality of agitation devices, such as Super Mixer (manufactured by KAWATA MFG Co., Ltd.), High Speed Mixer (manufactured by Fukae Co., Ltd.), New-Gra Machine (manufactured by Seishin Enterprise Co., Ltd.) and SV Mixer (manufactured by Kobelco Eco-Solutions Co., Ltd.), and those mixers can be employed.

In the coating process, the mixture of the heat-expandable microspheres and fine particle prepared in the mixing process is heated at a temperature higher than the softening point of the thermoplastic resin constituting the shell of the microspheres, and the heat-expandable microspheres are expanded and simultaneously coated with the fine particles on the outer surface of their shell.

The heat-expandable microspheres can be heated by a commonly used mixer dryer with contact heating system or direct heating system. The function of the mixer dryer is not specifically restricted, and the mixer dryer should preferably have the function of dispersing and mixing powder material under controlled temperature, and optionally have a decompression device for accelerating the drying operation or a cooling device. The heating device is not specifically restricted, and includes, for example, Loedige Mixer (manufactured by Matsubo Corporation) and Solidaire (manufactured by Hosokawa Micron Corporation).

The heating temperature should be fixed at the optimum expansion temperature for the heat-expandable microspheres to be heated, and the temperature preferably ranges from 100 to 400° C., more preferably from 120 to 350° C., further more preferably from 140 to 320° C., yet further more preferably from 150 to 280° C. and most preferably from 160 to 250° C.

In the above-mentioned process, the hollow particles a)2 having a further expansion ratio ranging from 20 to 80% are manufactured by properly modifying the expanding condition.

The hollow particles a)2 are composed of the hollow particles and the fine particles coating the outer surface of the shell of the microspheres as shown in FIG. 1. The coating mentioned herein means that the fine particles (4 or 5) are in a state of adhesion 4 on the outer surface of the shell 2, or in a state of fixation 5 in a dent on the outer surface of the shell as the result of the fine particles pushing into the thermoplastic shell softened or melted by heating. The form of the fine particles can be indefinite or spherical. The hollow particles coated with fine particles are preferable for their high dispersibility when kneaded in a base rubber.

The mean particle size of the fine particle preferably ranges from 0.001 to 30 μm, more preferably from 0.005 to 25 μm and most preferably from 0.01 to 10 μm. Fine particles having a mean particle size within the above range are well mixed with heat-expandable microspheres to manufacture the hollow particles a)2.

The ratio of the mean particle size of the fine particles to the mean particle size of the hollow particles a)2 (the mean particle size of the fine particle/the mean particle size of the hollow particles a)2) is preferably not higher than 1 for sufficiently coating the hollow particles with the fine particles, more preferably not higher than 0.8, further more preferably not higher than 0.6, yet further more preferably not higher than 0.4 and most preferably not higher than 0.2. The mean particle size of the fine particles mentioned herein is determined by laser diffractometry. Fine particles having a micron-order particle size are defined as primary particles. Fine particles of nano order size often gather into an aggregate of micron order size which acts like a particle. Thus, such aggregate or secondary particles are also measured as a unit equivalent to a particle to determine the mean particle size.

The fine particles can be selected from various materials including both inorganic and organic materials. The shape of the fine particles includes spherical, needle-like and plate-like shapes.

The inorganic compounds constituting the fine particles are not specifically restricted, and include, for example, wollastonite, sericite, kaolin, mica, clay, talc, bentonite, aluminum silicate, pyrophyllite, montmorillonite, calcium silicate, calcium carbonate, magnesium carbonate, dolomite, calcium sulfate, barium sulfate, glass flake, boron nitride, silicon carbide, silica, alumina, isinglass, titanium dioxide, zinc oxide, magnesium oxide, zinc oxide, hydrotalcite, carbon black, molybdenum disulfide, tungsten disulfide, ceramic beads, glass beads, crystal beads and glass microballoons.

The organic compounds for the fine particles are not specifically restricted, and include, for example, sodium carboxymethyl cellulose, hydroxyethyl cellulose, methyl cellulose, ethyl cellulose, nitro cellulose, hydroxypropyl cellulose, sodium alginate, polyvinyl alcohol, polyvinyl pyrolidone, sodium polyacrylate, carboxyvinyl polymer, polyvinyl methyl ether, magnesium stearate, calcium stearate, zinc stearate, polyethylene wax, lauric amide, myristic amide, palmitic amide, stearic amide, hydrogenated castor oil, (meth)acrylate resin, polyamide resin, silicone resin, urethane resin, polyethylene resin, polypropylene resin and fluorine resin.

The inorganic and organic compounds constituting the fine particles can be surface-treated with a surface-treatment agent, such as a silane coupling agent, paraffin wax, fatty acid, resin acid, urethane compound and fatty acid ester, or need not be surface-treated.

The true specific gravity of the hollow particles a)2 is not specifically restricted and preferably ranges from 0.05 to 0.70, more preferably from 0.07 to 0.55, further more preferably from 0.09 to 0.45, yet further more preferably from 0.1 to 0.35 and most preferably from 0.1 to 0.3. Hollow particles a)2 having a true specific gravity lower than 0.05 have low shear resistance and can partially break in the kneading process. In addition, such hollow particles have a low pressure resistance and can be dented by an external pressure applied to the hollow particles a)2 while the rubber composition for vulcanization molding is molded. Also, the volume of the molded products containing the dented hollow particles a)2 can decrease with the advancement of vulcanization to cause a poor lightweight effect by the hollow particles and poor dimensional stability of the rubber products. On the other hand, the hollow particles a)2 having a true specific gravity greater than 0.7 can be poorly effective for decreasing the specific gravity of the rubber compositions for vulcanization molding and have poor cost performance. This is because a greater amount of the hollow particles a)2 is required for blending with the rubber composition.

The amount of the fine particles to the weight of the hollow particles a)2 is not specifically restricted, and is preferably not higher than 90 wt %, more preferably not higher than 85 wt % and further more preferably not higher than 80 wt %. An amount of the fine particles higher than 90 wt % can result in an increased amount of the hollow particles a)2 added to the rubber compositions for vulcanization molding so as to decrease the cost performance of the hollow particles a2. The desirable lower limit of the amount of the fine particle is 60 wt %.

Process for Manufacturing the Hollow Particles a)3 and a)4
Wetting Process

The hollow particles a)1 and a)2 obtained in the above-mentioned processes are manufactured into the hollow particles a)3 and a)4 by wetting with a liquid organic compound (wetting process). The hollow particles wet with a liquid organic compound are preferable for preventing dusting and for improved dispersibility of the hollow particles in a base rubber.

The liquid organic compound used for the wetting process is not specifically restricted, and should satisfy the basic requirements of (i) having a boiling point higher than the vaporization point of the blowing agent and (ii) not dissolving or swelling the thermoplastic resin constituting the shell of the hollow particles.

For satisfying the requirement (i) and preventing volatilization of the liquid organic compound during storage, the liquid organic compound preferably has a boiling point ranging from 80 to 270° C., more preferably from 90 to 260° C. and most preferably from 100 to 250° C. As for the requirement (ii), the liquid organic compound can be selected from broader options if the heat-expandable microspheres are produced in the presence of a cross-linking agent in the polymerization step to improve the solvent resistance of the thermoplastic resin constituting the shell of the hollow particles.

The liquid organic compound is not specifically restricted, and includes, for example, plasticizers, such as dibutyl phthalate, diisooctyl phthalate, diisononyl phthalate, dioctyl adipate, tricresyl phosphate, triethyl citrate, acetylbutyl citrate and octyl alcohol; and monomers, such as dicyclopentane and styrene. Liquid organic compounds other than those mentioned above include, for example, nonionic surfactants, alkylene glycols, polyalkylene glycols, glycerin, process oils, silicone oils, liquid paraffin, naphthenic oils, aromatic oils and other fats and oils. One of or a combination of at least two of those liquid organic compounds can be used.

The ratio of the hollow particles a)1 or a)2 to the liquid organic compound to be blended is not specifically restricted, and is preferably defined at a ratio which decreases the dusting of the hollow particles to a practically acceptable level. Specifically, the amount of the liquid organic compound to be blended with the hollow particles a)1 preferably ranges from 20 to 5000 parts by weight to 100 parts by weight of the hollow particles, and more preferably from 100 to 3000 parts by weight. As for the hollow particles a)2, the same amount of the liquid organic compound as that mentioned above is preferable for 100 parts by weight of the hollow particles alone without the weight of the fine particles coating the hollow particles. An amount of the liquid organic compound of less than 20 parts by weight is not preferable, because such amount of the liquid organic compound results in considerable dusting of the hollow particles. On the other hand, an amount of the liquid organic compound greater than 5000 parts by weight causes a partially nonuniform blend of the hollow particles and the liquid organic compound due to the excessive amount of the liquid organic compound.

The process for wetting is not specifically restricted, if the hollow particles a)1 and a)2 can be wet with a liquid organic compound. For example, the process includes shaking or agitation of the hollow particles a)1 or a)2 with a liquid organic compound. Such shaking and agitation can be performed with a commonly used powder mixer including, for example, a ribbon mixer and multi-rotor mixer.

The blend of the hollow particles and a liquid organic compound is shaken and agitated until the hollow particles are wet uniformly. The completion of the wetting is determined by taking samples from several different spots in the wetting device, measuring the true specific gravity of each 0.5 to 0.8 g of the samples by the liquid substitution method, and evaluating the variation of the resultant true specific gravities with some means, such as the standard deviation. The standard deviation of the true specific gravity of the hollow particles a)3 and a)4 to indicate the completion of the wetting is not specifically restricted, and usually ranges from 0.05 to 1.0.

The processes mentioned above can manufacture the hollow particles a)3 or a)4 having a further expansion ratio ranging from 20 to 80%.

Process for Manufacturing the Hollow Particles A
Aging Process

The hollow particles a) are manufactured in the processes mentioned above, and all of the hollow particles a) are manufactured through the common processes of thermally expanding heat-expandable microspheres and cooling the resultant hollow particles to the room temperature. The volume of the blowing agent encapsulated in the hollow particles a) can decrease during the cooling to cause imbalance between internal pressure and external pressure of the hollow particles a) which makes the shape of the hollow particles irregular or decrease the resistance of the hollow particles to the external pressure. If such hollow particles a)

are added to a rubber composition for vulcanization molding, the hollow particles change their forms to cause poor dimensional stability of the resultant rubber products, or collapse or break to fail to attain intended lightweight effect of the rubber products.

In the aging process, the hollow particles a) are aged at a temperature ranging from 1 to 50° C. for over 3 days to obtain the hollow particles A. The aged hollow particles have improved resistance to external pressure and are preferable for surviving in a kneading process without breakage. An aging operation generally means the storage of a material under a suitable condition for a predetermined period in order to impart required properties to the material. As mentioned above, the hollow particles a) having undergone the decrease of their volume during the cooling have an irregular shape or poor resistance to external pressure due to the imbalance between their internal pressure and the external pressure. Thus, the aging mentioned herein makes a proper balance between the internal pressure and external pressure of the hollow particles a) and improves their resistance to the external pressure. Specifically the hollow particles a) are stored at a temperature ranging from 1 to 50° C. for over 3 days for aging.

The aging temperature for the hollow particles a) is not specifically restricted, and preferably ranges from 1 to 50° C., more preferably from 2 to 45° C., further more preferably from 3 to 40° C., yet further more preferably from 4 to 35° C. and most preferably from 5 to 30° C. An aging temperature lower than 1° C. can result in insufficient recovery of the hollow particles and cause irregular shapes of the hollow particles or breakage of the hollow particles. On the other hand, an aging temperature higher than 50° C. can result in slow release of the blowing agent from the hollow particles to cause irregular shapes of the hollow particles or breakage of the hollow particles.

The aging time for the hollow particles a) is not specifically restricted, and is preferably at least 3 days, more preferably at least 5 days, further more preferably at least 1 week, yet further more preferably at least 2 weeks, and most preferably at least 4 weeks. An aging time shorter than 3 days can result in insufficient effect of the aging. The upper limit of the aging time is not specifically restricted if the satisfactory effect of the aging is attained, and is usually about 8 weeks. After the aging, the hollow particles can be further stored within a period during which the quality of the hollow particles is maintained.

The hollow particles a)1 manufactured by dry thermal expansion are powder and are aged in the state of a powder. The hollow particles a)2 are also aged in the state of a powder. If the hollow particles are subjected to aging in a tightly sealed container with almost no space between adjacent hollow particles, they cannot be aged well even at a proper temperature and for a suitable aging time.

The processes mentioned above can manufacture the hollow particles A having a
Base Rubber The base rubber is an essential component of the rubber composition for vulcanization molding of the present invention. The Mooney viscosity ML (1+4) (hereinafter also referred to as Mooney viscosity) of the base rubber at 100° C. measured according to JIS K6300-1 (2013) usually ranges from 5 to 90 and preferably ranges from 15 to 85, more preferably from 25 to 80, further more preferably from 35 to 75 and most preferably from 45 to 70. The present inventors found that rubber products having good dimensional stability and good appearance with a sufficient light weight can be manufactured from a rubber composition which contains the hollow particles having a further expansion ratio within the specified range and the base rubber having a Mooney viscosity within the range mentioned above. A base rubber having a Mooney viscosity higher than 90 causes breakage of the hollow particles during kneading of the rubber composition containing the hollow particles and base rubber and thus fails to attain the intended lightweight of the resultant rubber products. Although the lower limit of the Mooney viscosity of the base rubber is not specifically restricted for solving the problems addressed by the present invention, a base rubber having a Mooney viscosity lower than 5 cannot attain the practically satisfactory mechanical properties including tensile strength, elongation and compression set of the resultant rubber products. A plurality of base rubbers having similar or different Mooney viscosities can be employed for the rubber composition, if the Mooney viscosity of the blend of those base rubbers ranges from 5 to 90. The Mooney viscosity indicates the molecular weight of the base rubber, and a base rubber having a Mooney viscosity within the range mentioned above does not break the hollow particles having a further expansion ratio ranging from 20 to 80%. Thus such base rubber can be manufactured into the rubber composition for vulcanization molding which can be processed into rubber products with a sufficient light weight, good dimensional stability and good appearance.

The base rubber is not specifically restricted, and includes, for example, natural rubbers, isoprene rubber, butadiene rubber, styrene-butadiene rubber, chloroprene rubber, acrylonitrile-butadiene rubber, ethylene-α-olefin copolymer rubber, ethylene-α-olefin-unconjugated diene copolymer rubber, halogenated ethylene-α-olefin-unconjugated diene copolymer rubber, sulfonated ethylene-α-olefin-unconjugated diene copolymer rubber, maleinized ethylene-α-olefin-unconjugated diene copolymer rubber, butyl rubber, isobutylene-isoprene rubber, nitrile rubber, hydrogenated nitrile rubber, urethane rubber, silicone rubber, chlorosulfonated polyethylene, chlorinated polyethylene, acrylic rubber, epichlorohydrin rubber, fluororubber, polysulfide rubber, propylene oxide rubber and thermoplastic elastomers. One of or a combination of at least two of the rubbers can be used. The base rubber preferably contains at least one selected from the group consisting of ethylene-α-olefin-unconjugated diene copolymer rubber, butadiene rubber, styrene-butadiene rubber, natural rubber, isoprene rubber, nitrile rubber, hydrogenated nitrile rubber, butyl rubber, fluororubber, silicone rubber, acrylonitrile-butadiene rubber, chloroprene rubber, acrylic rubber, chlorosulfonated polyethylene rubber, chlorinated polyethylene rubber, urethane rubber, isobutylene-isoprene rubber, polysulfide rubber, propylene oxide rubber and epichlorohydrin rubber; more preferably at least one selected from the group consisting of ethylene-α-olefin-unconjugated diene copolymer rubber, butadiene rubber, styrene-butadiene rubber, natural rubber, isoprene rubber and acrylic rubber; and most preferably ethylene-α-olefin-unconjugated diene copolymer rubber. The amount of ethylene-α-olefin-unconjugated diene copolymer rubber in the total weight of the base rubber is not specifically restricted, and is preferably at least 50 wt %, more preferably at least 70 wt % and most preferably at least 90 wt %. The desirable upper limit of the amount of ethylene-α-olefin-unconjugated diene copolymer rubber is 100 wt %.

The ethylene-α-olefin-unconjugated diene copolymer rubber is a random copolymer of ethylene, α-olefin and unconjugated diene. The α-olefin includes propylene, 1-butene, 1-penetene, 3-methyl-1-pentene, 4-methyl-1-pentene, 1-hexene, 1-heptene, 1-octene, 1-nonene, 1-decene, 1-undecene and 1-dodecene. Of those α-olefins, propylene, 1-hexene and 1-octene are preferable and propylene is more preferable. One of or a combination of at least two of the α-olefins can be used. The mole ratio of ethylene to α-olefin is not specifically restricted, and preferably ranges from 40:60 to 95:5, more preferably from 50:50 to 85:15 and further more preferably from 60:40 to 80:20.

The unconjugated diene includes 1,4-hexadiene, 3-methyl-1,4-hexadiene, 1,7-octadiene, 1,9-decadiene, 5-ethylidene-2-norbornene, 5-isopropylidene-2-norbornene, 5-isobutenyl-2-norbornene, cyclopentadiene, dicyclopentadiene and norbornadiene. Of those unconjugated dienes, 5-ethylidene-2-norbornene and dicyclopentadiene are preferable. One of or a combination of at least two of the unconjugated dienes can be used.

The iodine value of the base rubber is not specifically restricted, and preferably ranges from 5 to 50 (g/100 g), more preferably from 10 to 40, and further more preferably from 15 to 30. A base rubber having an iodine value within the range mentioned above contributes to the manufacture of a rubber composition with high cross-linking efficiency and such rubber composition can be manufactured into vulcanized rubber products having high resistance to compression set and environmental degradation.

Rubber Composition for Vulcanization Molding

The rubber composition for vulcanization molding of the present invention contains the hollow particles and base rubber. The amount of the hollow particles in the rubber composition for vulcanization molding is not specifically restricted, and preferably ranges from 0.1 to 30 wt %, more preferably from 0.3 to 20 wt %, further more preferably from 0.6 to 15 wt % and most preferably from 0.8 to 10 wt %. As for the rubber composition for vulcanization molding containing the complex hollow particles, the amount of the complex hollow particles in the rubber composition means the amount of the hollow particles alone without the fine particles and/or liquid organic compound. If the amount of the hollow particles alone in the rubber composition is less than 0.1 wt %, the hollow particles cannot attain a sufficient light weight of the resultant rubber products. On the other hand, if the amount of the hollow particles alone in the rubber composition is higher than 30 wt %, the hollow particles can fail to attain satisfactory mechanical properties including tensile strength and compression set of the resultant rubber products.

The amount of the base rubber in the rubber composition for vulcanization molding is not specifically restricted, and preferably ranges from 10 to 95 wt %, more preferably from 20 to 90 wt %, further more preferably from 30 to 75 wt % and most preferably from 35 to 60 wt %. The amount of the base rubber within the range mentioned above enables the manufacture of the rubber composition for vulcanization molding which can be manufactured into rubber products with sufficient lightweight without deteriorating the mechanical properties (tensile strength and compression set) of the base rubber.

The true specific gravity of the rubber composition for vulcanization molding of the present invention is not specifically restricted, and preferably ranges from 0.5 to 1.3, more preferably from 0.6 to 1.2 and further more preferably from 0.7 to 1.1

The rubber composition for vulcanization molding of the present invention can optionally contain known additives, such as strengthening agents, fillers, vulcanization and cross-linking agents, vulcanization accelerators, vulcanization accelerating auxiliaries, softeners, processing aids, antioxidants, ultraviolet absorbers, blowing agents, blowing auxiliaries, lubricants, pigments, colorants, dispersants and flame retardants.

The strengthening agents improve the mechanical properties, such as tensile strength, tearing strength and abrasion resistance, of vulcanized rubber. The strengthening agents include carbon blacks such as SRF, GPF, FEF, HAF, ISAF, SAF, FT and MT; carbon blacks obtained by surface-treatment of those carbon blacks with silane coupling agents or the like; finely-divided silicate; and silica. One of or a combination of at least two of the strengthening agents can be used. The amount of the strengthening agents added to the rubber composition is not specifically restricted, and usually less than 230 parts by weight of the strengthening agent is added to 100 parts by weight of the base rubber.

The fillers include inorganic fillers, such as calcium carbonate, light calcium carbonate, heavy calcium carbonate, magnesium carbonate, talc, clay, glass beads and glass balloons; and organic fillers, such as high-styrene resin, coumarone-indene resin, phenolic resin, lignin, modified melamine resin and petroleum resin, and the inorganic fillers are preferable. The rubber composition for vulcanization molding containing glass balloons as the filler is preferable for manufacturing rubber products having good dimensional stability with good lightweight effect. One of or a combination of at least two of the fillers can be used. The amount of the fillers added to the rubber composition is not specifically restricted, and usually ranges from 30 to 200 parts by weight to 100 parts by weight of the base rubber.

The vulcanization and cross-linking agents include sulfurs, such as powdered sulfur, precipitated sulfur, colloidal sulfur and insoluble sulfur; inorganic vulcanizing agents, such as sulfur chloride, selenium and tellurium; sulfur-containing organic compounds, such as morpholine disulfide, alkylphenol disulfides, thiuram disulfides and dithiocarbamate salt; and organic peroxides, such as 1,1-di-t-butylperoxy-3,3,5-trimethylcyclohexane, di-t-butyl peroxide, dicumyl peroxide, t-butylcumyl peroxide, 2,5-dimethyl-2,5-di(t-butylperoxy) hexane and 1,3-bis-(t-butylperoxy-isopropyl) benzene. One of or a combination of at least two of the vulcanization and cross-linking agents can be used. The amount of the vulcanization and cross-linking agents added to the rubber composition is selected depending on the variants of the agents, and usually ranges from 0.1 to 10 parts by weight to 100 pars by weight of the base rubber, preferably from 0.5 to 5 parts by weight. The vulcanization accelerators or vulcanization accelerating auxiliaries can be optionally used in combination with the vulcanization and cross-linking agents.

The vulcanization accelerators include aldehyde ammonias, such as hexamethylene tetramine; guanidines, such as diphenyl guanidine, di (o-tolyl) guanidine and o-tolyl-pyganide; thioureas, such as thiocarbanilide, di (o-tolyl) thiourea, N,N'-diethyl thiourea and dilauryl thiourea; thiazoles, such as mercaptobenzothiazole, dibenzothiazole disulfide and N,N'-di (ethylthiocarbamoylthio) benzothiazole; sulfenamides, such as N-t-butyl-2-benzothiadylsulfenamide; thiurams, such as tetramethylthiuram disulfide, tetraethylthiuram disulfide and tetrabutylthiuram disulfide; carbamates, such as zinc dimethylthiocarbamate, sodium dimethyldithiocarbamate, cupper dimethyldithiocarbamate, tellurium dimethylthiocarbamate and iron dimethylthiocarbamate; and xanthates, such as zinc butylthioxanthate.

One of or a combination of at least two of the vulcanization accelerators can be used. The amount of the vulcanization accelerators added to the rubber composition usually ranges from 0.1 to 20 parts by weight to 100 parts by weight of the base rubber, and preferably ranges from 0.2 to 10 parts by weight. The vulcanization accelerating auxiliaries include metal oxides, such as magnesium oxide and zinc oxide; and organic acids and their salts, such as stearic acid, oleic acid and zinc stearate, and zinc oxide and zinc stearate are especially preferred. One of or a combination of at least two of the vulcanization accelerating auxiliaries can be used. The amount of the vulcanization accelerating auxiliaries added to the rubber composition usually range from 0.5 to 20 parts by weight to 100 parts by weight of the base rubber.

The softeners include petroleum softeners, such as process oils, lubricant oils, paraffin, liquid paraffin, petroleum asphalt and vaseline; coal-tar softeners, such as coal tar and coal-tar pitch; fatty oil softeners, such as castor oil, flax seed oil, rape seed oil and coconut oil; tall oil; rubber substitutes; waxes, such as bees wax, carnauba wax and lanolin; fatty acids and fatty acid salts, such as recinoleic acid, palmitic acid, barium stearate, calcium stearate and zinc laurate; synthetic polymers, such as petroleum resins, atactic polypropylene and coumarone-indene resin; ester plasticizers, such as dioctyl phthalate, dioctyl adipate and dioctyl sebacate; carbonate ester plasticizers, such as diisododecyl carbonate; and others including microcrystalline wax, rubber substitutes (factice), liquid polybutadiene, modified liquid polybutadiene, liquid Thiokol and synthetic hydrocarbon lubricants. Of those softeners, petroleum softeners are preferable and process oil is especially preferable. The amount of the softeners added to the rubber composition is not specifically restricted and usually ranges from 10 to 200 parts by weight to 100 parts by weight of the base rubber.

The processing aids include higher fatty acids, such as recinoleic acid, stearic acid, palmitic acid and lauric acid; salts of higher fatty acids, such as barium stearate, zinc stearate and calcium stearate; and esters of higher fatty acids, such as recinoleates, stearates, palmitates and laurates. The antioxidants include amine antioxidants, hindered phenol antioxidants and sulfur antioxidants.

The blowing agents include inorganic blowing agents, such as ammonium carbonate, sodium bicarbonate and anhydrous sodium nitrate; and organic blowing agents, such as dinitrosopentamethylenetetramine, N,N'-dimethyl-N,N'-dinitrosoterephthalamide, benzenesulfonyl hydrazide, p,p'-oxybis (benzenesulfonyl hydrazide), 3,3'-disulfonehydrazide diphenylsulfone, azobisisobutylonitrile and azobisformamide. The blowing auxiliaries can be used in combination with the blowing agents. The blowing auxiliaries function to decrease the decomposition temperature of the blowing agents, accelerate the decomposition of the blowing agents and homogenize the sizes of the bubbles generated by the blowing agents. Such blowing auxiliaries include urea compounds, organic acids and metal salts. Although one of or a combination of at least two of those blowing agents and blowing auxiliaries can be used as far as they do not adversely affect the object of the present invention, it is preferable to use none of the blowing agents and blowing auxiliaries.

The lubricants include hydrocarbons, such as liquid paraffin; fatty acids, such as stearic acid; fatty acid amides, such as stearic acid amide; esters, such as butyl stearate; and alcohols, such as stearyl alcohol; their mixtures; and metal soaps.

The pigments include inorganic pigments, such as titanium dioxide, zinc oxide, ultramarine, colcothar, lithopone, lead, cadmium, iron, cobalt, aluminum, hydrochloride salts and nitrate salts; and organic pigments, such as azo pigments, phthalocyanine pigments, quinacridone pigments, quinacridone quinone pigments, dioxane pigments, anthrapyrimidine pigments, anthanthrone pigments, indanthrone pigments, flavanthrone pigments, perylene pigments, perinone pigments, diketopyrrolopyrrole pigments, quinonaphthalone pigments, anthraquinone pigments, thioindigo pigments, benzimidazolone pigments, isoindolin pigments and carbon black.

Process for Manufacturing the Rubber Composition for Vulcanization Molding

The process for manufacturing the rubber composition for vulcanization molding of the present invention is not specifically restricted, and includes, for example, a process in which the hollow particles and the base rubber, and optionally the additives such as a strengthening agent, filler, vulcanization and cross-linking agent, vulcanization accelerator, vulcanization accelerating auxiliary, softener, processing aid, antioxidant, ultraviolet absorber, blowing agent, blowing auxiliary, lubricant, pigment, colorant, dispersant and flame retardant, are blended and kneaded with a roll mill, such as an open roll mill or with an internal mixer (closed mixer) such as a Banbury mixer, kneader, pressure kneader or intermix at a temperature ranging from 30 to 150° C. for 3 to 90 minutes, and then taken out from the kneader into a proper portion. The method and order for blending the hollow particles, base rubber and additives to prepare the rubber composition for vulcanization molding of the present invention are not specifically restricted, and they can be prepared into the rubber composition, for example, in a process where the hollow particles, base rubber, a strengthening agent, filler, softener and the like are mixed by a Banbury mixer and then a vulcanization and cross-linking agent and vulcanization accelerator are added by a roller mixer.

The process for manufacturing the rubber composition for vulcanization molding preferably includes the process (I) for manufacturing the hollow particles which are composed of thermoplastic resin shell and a thermally vaporizable blowing agent encapsulated therein and have 20 to 80% of further expansion ratio defined by the formula (1), and the process (II) for kneading a composition containing at least one ingredient selected from the group consisting of the hollow particles manufactured in the process (I) and a masterbatch containing the hollow particles and a liquid organic compound and/or an organic base material and the base rubber having a Mooney viscosity ML (1+4) ranging from 5 to 90 at 100° C. measured according to JIS K6300-1 (2013). In the process (I), hollow particles having a further expansion ratio ranging from 20 to 80% are manufactured, and the process described in the "process for manufacturing the hollow particles a)1" is applicable for the process (I). In the process (II), a composition essentially containing at least one ingredient selected from the group consisting of the hollow particles manufactured in the process (I) and the masterbatch and the base rubber having a Mooney viscosity ranging from 5 to 90 is kneaded. The processes enable the manufacture of the rubber composition for vulcanization molding which can be processed into lightweight rubber products having good dimensional stability and good appearance.

The breakage ratio of the hollow particles in the process (II) is not specifically restricted, and is preferably not higher than 30%, more preferably not higher than 25%, further more preferably not higher than 20%, yet further more preferably not higher than 15%, still further more preferably not higher than 10% and most preferably not higher than 5%. The desirable lower limit of the breakage ratio is 0%. The breakage ratio of the hollow particles in the process (II) is the percentage of the hollow particles which are broken in kneading in the process (II). The hollow particles used for the rubber composition for vulcanization molding of the present invention are not apt to break owing to the further expansion ratio of the hollow particles ranging from 20 to 80% and the Mooney viscosity of the base rubber ranging from 5 to 90. Thus, the hollow particles result in the low breakage ratio as mentioned above. A breakage ratio of the hollow particles higher than 30% cannot result in rubber products with lightweight.

The hollow particles of the present invention are used for manufacturing the rubber composition for vulcanization molding containing the base rubber. The base rubber has a Mooney viscosity ML (1+4) ranging from 5 to 90 at 100° C. measured according to JIS K6300-1 (2013). The hollow particles are composed of a thermoplastic resin shell and a thermally vaporizable blowing agent encapsulated therein, and have a further expansion ratio defined by the formula (1) and ranging from 20 to 80%. The details of the hollow particles of the present invention have been described above.

The masterbatch in the present invention is a composition containing the hollow particles mentioned above and a liquid organic compound and/or an organic base material. Thus the masterbatch also contains the hollow particles a)3, a)4, A3 or A4 manufactured by the wetting process.

The liquid organic compound includes those used in the wetting process.

The organic base material is not specifically restricted, and includes the base rubber having a Mooney viscosity ranging from 5 to 90 as described above; thermosetting resins, such as epoxy resins, phenolic resins, unsaturated polyester resins and polyurethane; waxes, such as polyethylene waxes and paraffin waxes; thermoplastic resins, such as ethylene-vinyl acetate copolymer (EVA), polyethylene, modified polyethylene, polypropylene, modified polypropylene, modified polyolefin, polyvinyl chloride resin (PVC), acrylic resin, thermoplastic polyurethane, acrylonitrile-styrene copolymer (AS resin), acrylonitrile-butadiene-styrene copolymer (ABS resin), polystyrene (PS), polyamide resins (nylon 6, nylon 66, etc.), modified polyamide, polycarbonate, polyethylene terephthalate (PET), polybutylene terephthalate (PBT), polyacetal (POM), polyphenylene sulfide (PPS), polyphenylene ether (PPE) and modified polyphenylene ether; ionomer resins, such as ethylene ionomers, urethane ionomers, styrene ionomers and fluorine ionomers; bioplastics, such as polylactic acid (PLA), cellulose acetate, PBS, PHA and starch resins; sealing materials, such as modified silicones, polyurethanes, polysulfides, acrylates, silicones, polyisobutylenes and butyl rubbers; paint components, such as urethane polymers, ethylene-vinyl acetate copolymers, vinyl chloride polymers and acrylate polymers. One of or a combination of at least two of those organic base materials can be used. Of those base materials, the base rubber having a Mooney viscosity ranging from 5 to 90 is particularly preferable.

The amount of the hollow particles in the masterbatch is not specifically restricted, and preferably ranges from 2 to 60 wt %, more preferably from 4 to 55 wt %, further more preferably from 6 to 45 wt % and most preferably from 8 to 40 wt %. As for the masterbatch containing the complex hollow particles, the amount of the complex hollow particles in the masterbatch is the amount of the hollow particles alone without the fine particles and/or liquid organic compound. If the amount of the hollow particles alone in the masterbatch is less than 2 wt %, the added masterbatch cannot attain a sufficient lightweight effect of the resultant rubber products. On the other hand, if the amount of the hollow particles alone in the masterbatch is higher than 60 wt %, the hollow particles and the liquid organic compound and/or the organic base material can be non-uniformly blended.

The amounts of the liquid organic compound and/or the organic base material in the masterbatch are not specifically restricted. The amount of the liquid organic compound preferably ranges from 15 to 98 wt % and more preferably from 30 to 95 wt % in the masterbatch containing the liquid organic compound and not containing the organic base material. The amount of the organic base material preferably ranges from 35 to 90 wt % and more preferably from 45 to 80 wt % in the masterbatch containing the organic base material and not containing the liquid organic compound. For the masterbatch containing both of the liquid organic compound and organic base material, the amount of the total of the liquid organic compound and organic base material preferably ranges from 20 to 98 wt % and more preferably from 40 to 95 wt %.

The true specific gravity of the masterbatch is not specifically restricted, and should preferably range from 0.1 to 1.0, more preferably from 0.2 to 0.8, and further more preferably from 0.3 to 0.7.

The form of the masterbatch is not specifically restricted, and can be, for example, any of a lump, sheet or pellet.

The masterbatch can contain, in addition to the hollow particles, the liquid organic compound and/or the organic base material, known additives mentioned above, such as strengthening agents, fillers, vulcanization and cross-linking agents, vulcanization accelerators, vulcanization accelerating auxiliaries, softeners, processing aids, antioxidants, ultraviolet absorbers, blowing agents, blowing auxiliaries, lubricants, pigments, colorants, dispersants and flame retardants. The amount of the additives is optionally selected according to the application of the masterbatch.

The rubber composition for vulcanization molding of the present invention prepared as mentioned above can be manufactured into products without vulcanization, though the rubber composition exhibits the best property and performance when the composition is processed in vulcanization.

The rubber composition for vulcanization molding can be molded in various processes including extrusion molding, calendaring, compression molding, injection molding and transfer molding, and is preferably molded in compression molding, injection molding and extrusion molding.

The rubber composition for vulcanization molding is molded into an intended shape in those molding processes, and vulcanized simultaneously or vulcanized by introducing the molded products in a vulcanizer.

The vulcanization process includes, for example, heating a rubber composition for vulcanization molding which contains a vulcanizing and a cross-linking agent. The vulcanization temperature is not specifically restricted, and preferably ranges from 110 to 250° C., more preferably from 120 to 200° C., and further more preferably from 130 to 150° C. A vulcanization temperature lower than 110° C. cannot be effective to accelerate vulcanization of the rubber composition. On the other hand, a vulcanization temperature higher than 250° C. can deteriorate the lightweight effect by the hollow particles due to poor durability of the hollow particles against such high temperatures.

The vulcanization time is not specifically restricted, and preferably ranges from 3 to 80 minutes, more preferably from 5 to 40 minutes, and further more preferably from 10 to 20 minutes. The vulcanization time shorter than 3 minutes can fail to accelerate the vulcanization of the rubber composition. On the other hand, the vulcanization time longer than 80 minutes can deteriorate the lightweight effect by the hollow particles due to the shrinkage of the hollow particles during the long time heating.

The vulcanization can also be carried out by any of irradiation of light, gamma rays and electron beams. The vulcanization molding can be carried out with a mold or without a mold. In the vulcanization molding without a mold, molding and vulcanization processes are continuously performed. Heaters for a vulcanization line include those using hot air, a fluidized bed of glass beads, UHF (ultra-high frequency) or steam.

The rubber product of the present invention is manufactured from the rubber composition for vulcanization molding mentioned above. The rubber composition for vulcanization molding of the present invention is formed into products which have good dimensional stability and rarely change their true specific gravity before and after vulcanization. The ratio of the true specific gravity of the rubber composition for vulcanization molding before vulcanization (after kneading) ($d_3$) to the true specific gravity of the rubber composition for vulcanization molding after vulcanization ($d_4$), in other words, $d_3:d_4$, is not specifically restricted, and preferably meets the relation of $0.95 \leq (d_3/d_4) \leq 1.05$, more preferably $0.96 \leq (d_3/d_4) \leq 1.04$, further more preferably $0.97 \leq (d_3/d_4) \leq 1.03$ and most preferably $0.98 \leq (d_3/d_4) \leq 1.02$.

The amount of the hollow particles in the rubber product is not specifically restricted, and preferably ranges from 0.1 to 30 wt %, more preferably from 0.3 to 20 wt %, further more preferably from 0.6 to 15 wt %, and most preferably from 0.8 to 10 wt %. An amount of the hollow particles of less than 0.1 wt % cannot result in a poor lightweight effect of the rubber products. On the other hand, an amount of the hollow particles greater than 30 wt % can fail to attain satisfactory mechanical properties of the rubber product including tensile strength and compression set.

The amount of the base rubber in the rubber product is not specifically restricted, and preferably ranges from 10 to 95 wt %, more preferably from 20 to 90 wt %, further more preferably from 30 to 75 wt %, and most preferably from 35 to 60 wt %. The amount of the base rubber within the range mentioned above contributes to the manufacture of lightweight rubber product having good mechanical properties (tensile strength and compression set) and good abrasion resistance.

The rubber product of the present invention is preferable for various end uses including automotive parts such as hoses and weather-strips; electric and electronic parts including electric wire, wire joints, sealing materials and gaskets; civil engineering and construction parts including preformed gaskets, and waterproof sheeting for construction and civil engineering; rollers for office automation equipment including charging rollers, transfer rollers, developing rollers and paper feed rollers; industrial rollers including rolls for iron making and paper manufacturing, wire rolls for printing, and other industrial rollers; and parts for general industries.

The rubber product of the present invention is especially preferable for manufacturing weather-strips, rubber blankets for printing, automotive water hoses, air hoses, roofing sheets, wire covering and shoe soles.

EXAMPLE

The present invention will be specifically described with the following production Examples, Examples and Comparative examples, though the present invention should not be construed as being limited thereto. In the following, "%" means "wt %" and "part(s)" means "part(s) by weight" unless otherwise specified.

In the following description, firstly, the examples of the production of heat-expandable microspheres to be processed into the hollow particles; secondly, the examples and comparative examples of the manufacture of the hollow particles manufactured by thermally expanding the heat-expandable microspheres; and finally, the examples and comparative examples of the rubber composition and rubber products containing the hollow particles are given.

The properties of the hollow particles were measured and the performance of the hollow particles were tested and evaluated in the procedures mentioned below.

Mean Particle Size of Heat-Expandable Microspheres and Hollow Particles

A sample of heat-expandable microspheres and hollow particles was analyzed in dry system of a laser diffraction particle size analyzer (HEROS & RODOS, manufactured by SYMPATEC) with a dispersion pressure of 5.0 bar and the vacuum of 5.0 mbar in a dry dispersion unit. The mean volume diameter $D_{50}$ determined in the analysis was defined as the mean particle size.

Moisture Content of Heat-Expandable Microspheres and Hollow Particles

The moisture content of a sample of heat-expandable microspheres and hollow particles was determined with a Karl Fischer moisture meter (MKA-510N, manufactured by Kyoto Electronics Manufacturing Co., Ltd.).

$C_{w1}$: moisture content of heat-expandable microspheres (wt %)

$C_{w2}$: moisture content of hollow particles (wt %)

Encapsulation Ratio of a Blowing Agent ($C_1$) in Heat-Expandable Microspheres 1.0 g of a sample of heat-expandable microspheres was placed in a stainless steel evaporating dish 15 mm deep and 80 mm in diameter, and weighed out ($W_1$). Then 30 mL of acetonitrile was added to disperse the microspheres uniformly. After being left for 24 hours at room temperature, the microspheres were dried under reduced pressure at 130° C. for 2 hours, and the dry weight ($W_2$) was determined. The encapsulation ratio of the blowing agent ($C_1$) was calculated by the following formula:

$$C_1(\text{wt \%}) = (W_1 - W_2)(g)/1.0(g) \times 100 - (C_{w1})(\text{wt \%})$$

where the moisture content was calculated in the method mentioned above.

Encapsulation Ratio of a Blowing Agent ($C_2$) in Hollow Particles 0.20 g of a sample of hollow particles was placed in a stainless steel evaporating dish 15 mm deep and 80 mm in diameter, and weighed out ($W_3$). Then 30 mL of acetonitrile was added to disperse the hollow particles uniformly. After being left for 30 minutes at room temperature, the hollow particles were heated at 130° C. for 2 hours, and the dry weight ($W_4$) was determined. The encapsulation ratio of the blowing agent ($C_2$) was calculated by the following formula. For measuring the encapsulation ratio of the blowing agent in the hollow particles a)2 or A2, the hollow particles were pretreated as follows.

The hollow particles a)2 or A2 coated with fine particles were washed with a solvent such as HCl and further washed with water to remove the fine particle on the hollow particles and prepare the hollow particles without the fine particle.

$$C_2(\text{wt \%}) = (W_3 - W_4)(g)/0.20(g) \times 100 - (C_{w2})(\text{wt \%})$$

where the moisture content was calculated in the method mentioned above.

Determination of Expansion-Initiation Temperature ($T_{s1}$) and Maximum Expansion Temperature ($T_{max1}$) of Heat-Expandable Microspheres Those temperatures were determined with a DMA (DMA Q800, manufactured by TA Instruments). In an aluminum cup 4.8 mm deep and 6.0 mm in diameter (5.65 mm in inside diameter), 0.5 mg of heat-expandable microspheres were placed, and the cup was covered with an aluminum cap 0.1 mm thick and 5.6 mm in diameter to prepare a sample. The sample was set on the device and subjected to the pressure of 0.01 N with the compression unit of the device, and the height of the sample was measured. The sample was then heated at temperature levels elevating at a rate of 10° C./min within the temperature range from 20 to 300° C., being subjected to the pressure of 0.01 N with the compression unit, and the vertical change of the position of the compression unit was measured. The temperature at which the compression unit started to change its position to the positive direction was determined as the expansion-initiation temperature ($T_{s1}$), and the temperature at which the compression unit indicated the highest position ($H_{max}$) was determined as the maximum expansion temperature ($T_{max1}$).

Determination of Re-Expansion-Initiation Temperature ($T_{s2}$) and Maximum Re-Expansion Temperature ($T_{max2}$) of Hollow Particles The determination was conducted in the same manner as that mentioned above except that the heat-expandable microspheres were replaced by hollow particles. The temperature at which the compression unit started to change its position to the positive direction was determined as the expansion-initiation temperature ($T_{s2}$), and the temperature at which the compression unit indicated the highest position ($H_{max}$) was determined as the maximum expansion temperature ($T_{max2}$).

True Specific Gravity (d) of Complex Hollow Particles

Before the determination of the true specific gravity ($d_1$) of the hollow particles of the complex hollow particles, the true specific gravity (d) of the complex hollow particles was determined in the following procedure.

The true specific gravity of the complex hollow particles was determined by the liquid substitution method (Archimedean method) with isopropyl alcohol in an atmosphere at 25° C. and 50% RH (relative humidity) as described below.

At first, an empty 100-mL measuring flask was dried and weighed ($W_{B1}$). Then isopropyl alcohol was poured into the weighed measuring flask to form meniscus accurately, and the measuring flask filled with isopropyl alcohol was weighed ($W_{B2}$). The 100-mL measuring flask was then emptied, dried, and weighed ($W_{S1}$). About 50 mL of the complex hollow particles were placed in the weighed measuring flask, and the measuring flask containing the complex hollow particles was weighed ($W_{S2}$). Then isopropyl alcohol was poured into the measuring flask containing the complex hollow particles to form meniscus accurately without taking bubbles into the isopropyl alcohol, and the flask containing the complex hollow particles and isopropyl alcohol was weighed ($W_{S3}$). The values, $W_{B1}$, $W_{B2}$, $W_{S1}$, $W_{S2}$, and $W_{S3}$, were introduced into the following formula to calculate the true specific gravity (d) of the complex hollow particles.

$$d=[(W_{S2}-W_{S1})\times(W_{B2}-W_{B1})/100]/[(W_{B2}-W_{B1})-(W_{S3}-W_{S2})]$$

True Specific Gravity ($d_1$) of Hollow Particles of Complex Hollow Particles

The true specific gravity ($d_1$) of the hollow particles of complex hollow particles was calculated by the following formula:

$$d_1=X/\{(100/d)-(Y/d_Y)-(Z/d_Z)\}$$

where X, Y, Z, d, $d_Y$ and $d_Z$ indicate the following values.

X: the weight fraction (%) of the hollow particles in the complex hollow particles Y: the weight fraction (%) of the fine particle in the complex hollow particles Z: the weight fraction (%) of the liquid organic compound in the complex hollow particles d: the true specific gravity of the complex hollow particles $d_Y$: the true specific gravity of the fine particle $d_Z$: the true specific gravity of the liquid organic compound The complex hollow particles are composed of the hollow particles, the fine particle and/or the liquid organic compound, and the sum of X, Y and Z is 100.

As for the hollow particles a)1 and A1, their true specific gravity ($d_1$) is equal to the true specific gravity (d) of the complex hollow particles mentioned above.

True Specific Gravity ($d_2$) of Hollow Particles at Maximum Re-Expansion

Before the determination of the true specific gravity ($d_2$) of hollow particles at their maximum re-expansion, the true specific gravity (d') of the complex hollow particles at their maximum re-expansion was determined in the following procedure.

A 12-cm long, 13-cm wide and 9-cm high flat-bottomed box was made of aluminum foil, and 1.0 g of the complex hollow particles was placed into uniform thickness. Then the heating of the complex hollow particles was started at the expansion initiation temperature obtained by the measuring method mentioned above. The heating temperature was repeatedly raised by 5° C. and maintained for 1 minute to heat the complex hollow particles, and at each step of temperature raising the true specific gravity of the re-expanded complex hollow particles was determined in the same manner as in the determination method of the true specific gravity mentioned above. The lowest true specific gravity of the results was defined as the true specific gravity of the complex hollow particles (d') at their maximum re-expansion.

The true specific gravity of the complex hollow particles (d') at their maximum re-expansion determined as mentioned above was calculated into the true specific gravity of the hollow particles ($d_2$) at their maximum re-expansion by the same formula for calculating the true specific gravity ($d_1$) of the hollow particles mentioned above. As for the hollow particles a)1 and A1, their true specific gravity ($d_2$) at their maximum re-expansion is equal to the true specific gravity (d') of the complex hollow particles at their maximum re-expansion mentioned above.

Escape-Initiation Temperature ($T_R$) of a Blowing Agent from Hollow Particles

The determination was conducted with a TG-DTA system (TG8120, manufactured by Rigaku Corporation). A sample (W g) of the hollow particles was placed in an aluminum pan of 5.2 mm in external diameter, and at first heated by elevating the temperature from 25 to 50° C. at the rate of 10° C./min. Then the sample was heated at 50° C. for 30 minutes to remove moisture to the constant weight, $W_0$(g). Then the heating was started from 50° C. by elevating the temperature at the rate of 10° C./min to 350° C. The temperature at which the weight of the sample, Wo (g), decreased by 0.5 wt % (or the weight of the sample decreased to 0.995Wo) was defined as the escape-initiation temperature, $T_R$ (° C.), of the blowing agent.

Figure 2:
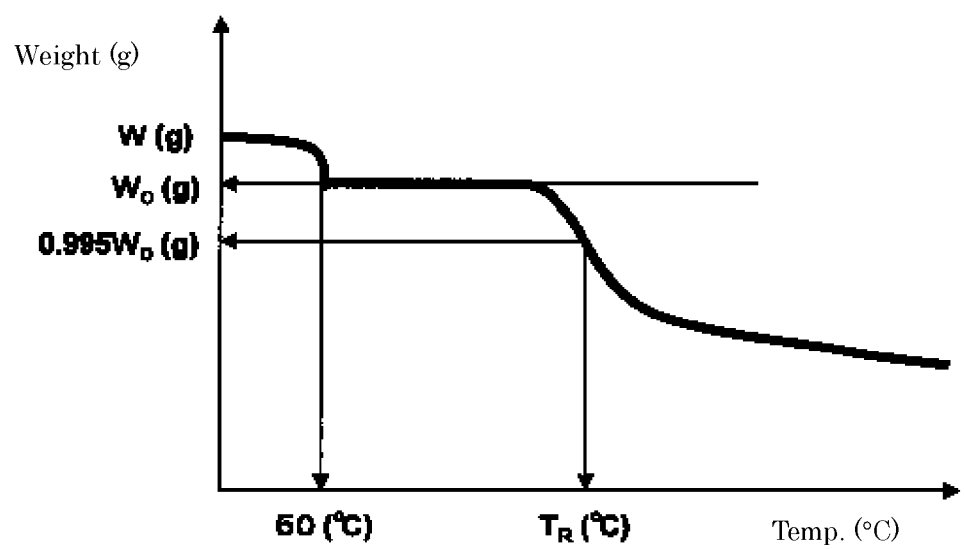
FIG. 2 is an illustrative drawing of the escape-initiation temperature of the blowing agent from the hollow particles.

FIG. 2 shows the TG analysis data of the hollow particles and the escape-initiation temperature, $T_R$ (° C.) of the blowing agent.

True Specific Gravity ($d_p$) of the Shells of Hollow Particles

The hollow particles a)2 and A2 coated with fine particles were washed with a solvent such as HCl and further washed with water to remove the fine particle on the hollow particles before the determination of the true specific gravity of the shells of the hollow particles.

30 g of the hollow particles after the washing was dispersed in 900 mL of acetonitrile, subjected to ultrasonic dispersion for 30 minutes and stood still for 3 hours at room temperature. Then the hollow particles were heated and dried at 120° C. for 5 hours. The resultant shells of the hollow particles were further dried under reduced pressure by vacuum pump until the weight of the shells would not change. Then the true specific gravity ($d_p$) of the shells (the thermoplastic resin constituting the shells) of the hollow particles was determined in the same manner as in the determination of the true specific gravity of the hollow particles mentioned above.

Mean Thickness of the Shells of Hollow Particles

The hollow particles a)2 and A2 coated with a fine particle were washed with a solvent such as HCl and further washed with water to remove the fine particle on the hollow particles before the determination of the mean thickness of the shells of hollow particles.

The mean thickness of the shells of the hollow particles was calculated by the following formula:

Mean thickness of the shells of the hollow particles=$<x_1>/2[1-\{1-d_1(1-C_2/100)/d_p\}^{1/3}]$ where $<x_1>$, $d_1$, $d_p$, and $C_2$ indicate the following values.
$<x_1>$: mean particle size D50 (μm) of the hollow particles
$d_1$: true specific gravity of the hollow particles
$d_p$: true specific gravity of the thermoplastic resin constituting the shells
$C_2$: encapsulation ratio (wt %) of the blowing agent in the hollow particles Ratio of the Mean Thickness of the Shells, K, to the Mean Particle Size D50 of Hollow Particles The ratio of the mean thickness of the shells, K, of the hollow particles to the mean particle size D50 of the hollow particles was calculated by the following formula.

$K(\%)$=(mean thickness of the shells of hollow particles)/$<x_1>\times 100$

Further Expansion Ratio of Hollow Particles

Further expansion ratio of hollow particles (%)= $(1-d_2/d_1)\times 100$ $d_2$: true specific gravity of hollow particles in the state of maximum re-expansion at the maximum re-expansion temperature
$d_1$: true specific gravity of the hollow particles before re-expansion True Specific Gravities of Rubber Composition and Molded Rubber Product The true specific gravity of the rubber composition ($d_3$) and the molded rubber product ($d_4$) were determined by an analytical electronic balance AX200 (manufactured by Shimadzu Corporation) with the specific gravity measurement mode for solid substance.

Breakage Ratio of Hollow Particles

The breakage ratio of hollow particles means the ratio of the hollow particles broken in kneading process where a composition containing the hollow particles and base rubber is kneaded. The breakage ratio was calculated from the true specific gravity of the hollow particles ($d_7$) after kneading and the true specific gravity of the hollow particles ($d_1$) before kneading by the following formula. The true specific gravity of the hollow particles ($d_7$) after kneading can be calculated from the true specific gravity ($d_3$) of the rubber composition after kneading.

Breakage ratio (%)=$(1-d_1/d_7)\times 100$ $d_1$: true specific gravity of hollow particles before kneading
$d_7$: true specific gravity of hollow particles after kneading Theoretical True Specific Gravity ($d_5$) of Rubber Composition The theoretical true specific gravity ($d_5$) of the rubber composition was calculated from the weight ($W_n$, $W_{n+1}$, ..., $W_{n+i}$) of each of the components including the bas rubber, filler, softener, vulcanizing agent, and the like (n, n+1, ..., n+i) contained in the rubber composition, their true specific gravities ($d_n$, $d_{n+i}$, ..., $d_{n+i}$), and the weight (M) and the true specific gravity ($d_1$) of the hollow particles added to the rubber composition by the following formula:

$d_5=(W_n+W_{n+1}+ \ldots +W_{n+i}+M)/((W_n/d_n)+(W_{n+1}/d_{n+1})+ \ldots +(W_{n+i}/d_{n+i})+(M/d_1))$ where the abbreviations indicate the following values.
$d_5$: theoretical true specific gravity of the rubber composition
M: weight of the hollow particles added to the rubber composition
$d_1$: true specific gravity of the hollow particles added to the rubber composition
$W_n$, $W_{n+1}$, ..., $W_{n+i}$: weight of each of the components, n, n+1, ..., n+i, contained in the rubber composition
$d_n$, $d_{n+1}$, ..., $d_{n+i}$: true specific gravity of each of the components, n, n+1, ..., n+i, contained in the rubber composition Lightweight Effect for a Molded Rubber Product The lightweight effect for a molded rubber product was evaluated according to the ratio of the true specific gravity ($d_4$) of the molded rubber product manufactured from the rubber composition to the theoretical true specific gravity ($d_5$) of the rubber composition calculated from the amount of each of the components.

Excellent: $(d_4/d_5)\leq 1.10$
Poor: $1.10<(d_4/d_5)$ $d_4$: true specific gravity of the molded rubber product manufactured by vulcanization molding
$d_5$: theoretical true specific gravity of the rubber composition used for manufacturing the molded rubber product Appearance of a Molded Rubber Product The surface roughness of a molded rubber product was visually inspected and evaluated according to the following three criteria.

Excellent: smooth surface with no unevenness
Fair: acceptable though a few unevennesses are found on the surface
Poor: rough surface with many unevennesses Dimensional Stability of a Molded Rubber Product The dimensional stability means the difference between the volume of a molded product and the volume of a kneaded rubber composition before vulcanization. The dimensional stability was evaluated according to the following criteria.

Excellent: $0.95 \leq (d_3/d_4) \leq 1.05$

Poor: $(d_3/d_4) < 0.95$ or $1.05 < (d_3/d_4)$ $d_3$: true specific gravity of the kneaded rubber composition $d_4$: true specific gravity of the vulcanized molded rubber product Comprehensive Evaluation of a Molded Rubber Product A molded rubber product evaluated as "Excellent" in all of the evaluations for the lightweight effect, appearance and dimensional stability was comprehensively evaluated as "Excellent", a molded rubber product evaluated as "Fair" in one of those three properties was comprehensively evaluated as "Fair", and molded rubber product evaluated as "Poor" in at least one of those three properties was comprehensively evaluated as "Poor".

Example of Production 1 for Producing Heat-Expandable Microspheres

An aqueous dispersion medium was prepared by adding 120 g of sodium chloride, 2 g of polyvinyl pyrolidone, 85 g of colloidal silica containing 20 wt % of silica, and 0.2 g of carboxymethylated polyethylene imine (CMPEI, having 80% of —$CH_2COONa$ as substituted alkyl groups, with weight-average M.W. of 50,000) to 600 g of deionized water and adjusting the pH of the mixture within the range from 2.8 to 3.2. The CMPEI is the same as that described in the paragraph 0140 of WO2008/142849.

An oily mixture was prepared by mixing 130 g of acrylonitrile, 99 g of methacrylonitrile, 5 g of isobornyl methacrylate, 1.2 g of ethylene glycol dimethacrylate (EDMA), and the blowing agents including 25 g of isobutane, 15 g of isopentane and 3 g of 2,2-azobis(isobutyronitrile) (AIBN). The aqueous dispersion medium and the oily mixture were mixed and agitated at 10,000 rpm for 1 minute with a Homo-mixer (TK Homomixer, manufactured by Primix Corporation) to be prepared into a suspension. The resultant suspension was transferred to a compressive reactor of 1.5-liter capacity, purged with nitrogen, and polymerized at 65° C. for 20 hours with agitation at 80 rpm under the initial reaction pressure of 0.3 MPa. The resultant polymerization product was filtered and dried to be prepared into heat-expandable microspheres (Microsphere (1)). The properties of the Microsphere (1) are shown in Table 1.

TABLE 1

| | | Examples of production of heat-expandable microspheres | | | | |
|---|---|---|---|---|---|---|
| | | 1 Microspheres (1) | 2 Microspheres (2) | 3 Microspheres (3) | 4 Microspheres (4) | 5 Microspheres (5) |
| Aqueous dispersion medium (parts by weight) | Deionized water | 600 | 600 | 600 | 600 | 600 |
| | Sodium chloride | 120 | 130 | 150 | 160 | 140 |
| | Colloidal silica | 85 | 65 | 85 | 90 | 54 |
| | Polyvinyl pyrolidone | 2 | 4 | 2.5 | 3 | 3 |
| | CMPEI | 0.2 | 0.3 | 1.2 | 0.4 | 0.6 |
| pH of aqueous dispersion medium | | 3 | 3 | 3 | 3 | 3 |
| Polymerizable monomer (parts by weight) | Acrylonitrile | 130 | 130 | 135 | 115.3 | 90.3 |
| | Methacrylonitrile | 99 | 99 | 70.2 | 67 | 60 |
| | Isobornyl methacrylate | 5 | 5 | 0 | 0 | 3.4 |
| | Methyl methacrylate | 0 | 0 | 10 | 0 | 0 |
| | Methacrylic acid | 0 | 0 | 18.5 | 51.7 | 80 |
| Cross-linking agent (parts by weight) | Ethylene glycol dimethacrylate | 1.2 | 1.2 | 0 | 0 | 0 |
| | PEG (400) diacrylate | 0 | 0 | 1.5 | 2.4 | 1.5 |
| Blowing agent (parts by weight) | Isobutane (iC4) | 25 | 30 | 15 | 0 | 0 |
| | Isopentane (iC5) | 15 | 70 | 40 | 28 | 40 |
| | Isooctane (iC8) | 0 | 0 | 0 | 0 | 12 |
| Polymerization initiator (parts by weight) | 2,2'-azobisisobutylonitrile | 3 | 0 | 3.5 | 0 | 2.5 |
| | di-2-ethylhexy peroxydicarbonate | 0 | 2.5 | 0 | 1.5 | 0 |
| Mixing parameters | rpm × time (min) | 10000 × 1 | 10000 × 1 | 8000 × 1 | 8000 × 1 | 8000 × 1 |
| Polymerization temperature (° C.) | | 65 | 58 | 65 | 55 | 65 |
| Heat-expandable microspheres | Mean particle size D50 (µm) | 14.3 | 41.2 | 26.3 | 12.6 | 23.1 |
| | Encapsulation ratio of blowing agent $C_1$ (%) | 13.2 | 24 | 18.5 | 9.9 | 16 |
| | Expansion initiation temperature $T_{s1}$ (° C.) | 113 | 108 | 134 | 157 | 180 |
| | Maximum expansion temperature $T_{max1}$ (° C.) | 155 | 158 | 163 | 186 | 225 |

Examples of Production 2 to 5 for Producing Heat-Expandable Microspheres

In the examples of production 2 to 5, the heat-expandable microspheres (Microspheres (2) to (5)) were produced in the same manner as in Example of production 1 except that different conditions and parameters shown in Table 1 were employed for the polymerization. The properties of the microspheres were evaluated and are shown in Table 1.

Examples of Manufacture 1 to 9 and Comparative Examples of Manufacture 1 and 2 for Manufacturing Hollow Particles In the examples of manufacture 1, 2, 4 to 6 and 8 and the comparative examples 1 and 2 for manufacturing hollow particles, the heat-expandable microspheres shown in Table 2 were thermally expanded into the hollow particles by dry thermal expansion. The dry thermal expansion was conducted by the internal injection process disclosed in U.S. Patent Application Publication 2007-0154711 (Japanese Patent Application Publication 2006-213930) incorporated herein by reference. Specifically, the heat-expandable microspheres were manufactured into hollow particles by thermal expansion with the manufacturing device having the expansion part as shown in FIG. 3 in the procedure mentioned below.

Expansion Part of the Manufacturing Device

Figure 3:
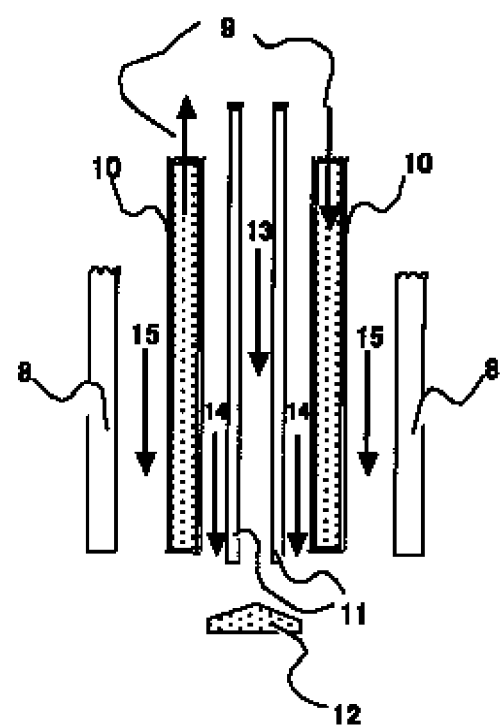
FIG. 3 is a schematic diagram of the expansion part of a device for manufacturing hollow particles by dry thermal expansion.

As shown in FIG. 3, the expansion part has the gas inlet tube (not indicated by a number) having the distribution nozzle (11) at its outlet and placed at the center of the part, the collision plate (12) positioned below the distribution nozzle (11), the overheat prevention jacket (10) surrounding the gas inlet tube without touching the tube, and the hot air nozzle (8) surrounding the overheat prevention jacket (10) without touching the jacket. A gas fluid (13) containing heat-expandable microspheres is run through the gas inlet tube in the direction of the arrow, and a gas flow (14) is run through the space between the gas inlet tube and the overheat prevention jacket (10) in the direction of the arrows in order to improve the dispersion of the heat-expandable microspheres and prevent overheat of the gas inlet tube and collision plate. Furthermore, a hot airflow (15) is run through the space between the overheat prevention jacket (10) and the hot air nozzle (8) in the direction of the arrows in order to thermally expand the heat-expandable microspheres. The hot airflow (15), the gas fluid (13) and the gas flow (14) usually run in the same direction. A refrigerant flow (9) is run in the overheat prevention jacket (10) in the direction of the arrows in order to cool the jacket.

Operation of the Manufacturing Device

In the injection step, the gas fluid (13) containing heat-expandable microspheres is introduced in the gas inlet tube having the distribution nozzle (11) at its outlet and placed at the inside of the hot airflow (15), and the gas fluid (13) is injected from the distribution nozzle (11).

In the distribution step, the gas fluid (13) is made collide with the collision plate (12) positioned below the dispersion nozzle (11) and the heat-expandable microspheres are uniformly dispersed in the hot airflow (15). The gas fluid (13) injected from the dispersion nozzle (11) is lead to the collision plate (12) together with the gas flow (14) and collide with the collision plate.

In the expansion step, the dispersed heat-expandable microspheres are heated in the hot airflow (15) at a temperature higher than their expansion-initiation temperature to be expanded. Then the resultant hollow particles a)1 are cooled and collected.

Example of Manufacture 1 for Manufacturing Hollow Particles

The hollow particles a)1 were manufactured by thermally expanding the heat-expandable microspheres (Microspheres (1)) with the manufacturing device shown in FIG. 3, with the expansion parameters including the feeding rate of the heat-expandable microspheres of 0.8 kg/min, flow rate of the gas fluid of 0.35 m³/min, flow rate of the hot airflow of 8.0 m³/min and hot airflow temperature at 270° C. The hollow particles a)1 were aged at 30° C. for 3 days to be prepared into hollow particles (1) (the hollow particles A(1)). The properties of the hollow particles (the hollow particles A(1)) are shown in Table 2. hollow particles (1) have the true specific gravity ($d_1$) of 0.30, the true specific gravity ($d_2$) at their maximum re-expansion of 0.015, and the further expansion ratio of 50.0%. The re-expansion initiation temperature ($T_{s2}$) of hollow particles (1) was 112° C. and the maximum re-expansion temperature ($T_{max2}$) of hollow particles (1) was 158° C.

TABLE 2

| | | Example of manufacture of hollow particles | | | | | |
|---|---|---|---|---|---|---|---|
| | | 1 | 2 | 3 | 4 | 5 | 6 |
| | Resultant hollow particles | Hollow particles (1) | Hollow particles (2) | Hollow particles (3) | Hollow particles (4) | Hollow particles (5) | Hollow particles (6) |
| | Heat-expandable microspheres used | Microspheres (1) | Microspheres (2) | Microspheres (3) | Microspheres (4) | Microspheres (4) | Microspheres (5) |
| Hollow particles | Heat-expandable microspheres (parts by weight) | 100 | 100 | 20 | 100 | 100 | 100 |
| | Fine particles (parts by weight) | 0 | 0 | 80 | 0 | 0 | 0 |
| Properties of hollow particles | True specific gravity of complex hollow particles (d) | — | — | 0.34 | — | — | — |
| | True specific gravity of hollow particles ($d_1$) | 0.030 | 0.027 | 0.076 | 0.053 | 0.073 | 0.087 |
| | Mean particle size D50 (μm) | 47.3 | 93.4 | 63.5 | 33.4 | 30.2 | 53.4 |
| | Encapsulation ratio of blowing agent ($C_2$) (%) | 12.8 | 17.5 | 18.1 | 9.4 | 9.2 | 15.8 |
| | True specific gravity of complex hollow particles at maximum re-expansion (d') | — | — | 0.1 | — | — | — |
| | True specific gravity of hollow particles at maximum re-expansion ($d_2$) | 0.015 | 0.021 | 0.021 | 0.037 | 0.037 | 0.022 |
| | Further expansion ratio (%) | 50.0 | 22.2 | 72.4 | 30.2 | 49.3 | 74.7 |
| | Escape initiation temperature of blowing agent (° C.) | 112 | 132 | 135 | 162 | 158 | 179 |
| | Mean thickness of shell (μm) | 0.19 | 0.32 | 0.61 | 0.24 | 0.31 | 0.61 |

TABLE 3

|  |  | Example of manufacture of hollow particles | | | Comparative example of manufacture of hollow particles | |
|---|---|---|---|---|---|---|
|  |  | 7 | 8 | 9 | 1 | 2 |
|  | Resultant Hollow particles | Hollow particles (7) | Hollow particles (8) | Hollow particles (9) | Hollow particles (10) | Hollow particles (11) |
|  | Heat-expandable microspheres used | Microspheres (5) | Microspheres (2) | Microspheres (4) | Microspheres (1) | Microspheres (2) |
| Hollow particles | Heat-expandable microspheres (parts by weight) | 20 | 100 | 20 | 100 | 100 |
|  | Fine particles (parts by weight) | 80 | 0 | 80 | 0 | 0 |
| Properties of hollow particles | True specific gravity of complex hollow particles (d) | 0.2 | — | 0.22 | — | — |
|  | True specific gravity of hollow particles ($d_1$) | 0.043 | 0.032 | 0.047 | 0.018 | 0.055 |
|  | Mean particle size D50 (μm) | 66.5 | 129.8 | 34.7 | 54.1 | 108.3 |
|  | Encapsulation ratio of blowing agent ($C_2$) (%) | 15.3 | 22.3 | 8.3 | 5.2 | 22.8 |
|  | True specific gravity of complex hollow particles at maximum re-expansion (d') | 0.11 | — | 0.18 | — | — |
|  | True specific gravity of hollow particles at maximum re-expansion ($d_2$) | 0.022 | 0.0097 | 0.037 | 0.015 | 0.0097 |
|  | Further expansion ratio (%) | 48.8 | 69.7 | 21.3 | 16.7 | 82.4 |
|  | Escape initiation temperature of blowing agent (° C.) | 175 | 100 | 142 | 76 | 102 |
|  | Mean thickness of shell (μm) | 0.37 | 0.49 | 0.23 | 0.14 | 0.71 |

Examples of Manufacture 2, 4 to 6, and 8 and Comparative Examples of Manufacture 1 and 2 for Manufacturing Hollow Particles In the examples of manufacture 2, 4 to 6, and 8 and comparative examples of manufacture 1 and 2 for manufacturing hollow particles, hollow particles (2), (4) to (6), (8), (10) and (11) were manufactured from the heat-expandable microspheres shown in Tables 2 and 3 in the same manner as that in the example of manufacture 1 for manufacturing hollow particles, except that the hot airflow temperature was set at 310° C., 340° C., 280° C., 390° C., 260° C., 330° C. and 230° C., respectively. The properties of the resultant hollow particles (the hollow particles A1) are shown in Tables 2 and 3.

The hollow particles (10) manufactured in Comparative example 1 of manufacture had the further expansion ratio of 16.7%, and the re-expansion initiation temperature ($T_{s2}$) of 73° C. and maximum re-expansion temperature ($T_{max2}$) of 131° C.

Example of Manufacture 3 for Manufacturing Hollow Particles

In a separable flask, 20 parts by weight of Microspheres (3) and 80 parts by weight of calcium carbonate (Whiten SB Red, with mean particle size about 1.8 μm determined by laser diffractometry, manufactured by Bihoku Funka Kogyo Co., Ltd.) were mixed. Then the mixture was heated to 160° C. with agitation over 5 minutes to be manufactured into the hollow particles a)2. The hollow particles a)2 were aged at 30° C. for 3 days to be manufactured into hollow particles (3) (the hollow particles A2).

The true specific gravity of hollow particles (3) in the state of the complex hollow particles (d) was 0.34, and the true specific gravity of the hollow particles (3) without the coating material ($d_1$) was 0.076. The true specific gravity of hollow particles (3) in the state of the complex hollow particles at their maximum re-expansion (d') was 0.1 and the true specific gravity of the hollow particles (3) without the coating material at their maximum re-expansion ($d_2$) was 0.021. The further expansion ratio of hollow particles (3) (the hollow particles A2) was 72.4%.

Examples of Manufacture 7 and 9 for Manufacturing Hollow Particles

Hollow particles (7) and (9) were manufactured respectively from Microspheres (5) and (4) in the same manner as that in the example of manufacture 3 for manufacturing hollow particles, except that the heating temperature was set at 170° C. and 165° C., respectively. The properties of the resultant hollow particles A2 are shown in Table 3. The further expansion ratio of hollow particles (7) and (9) were 48.8% and 21.3%, respectively.

Manufacture of Rubber Composition for Vulcanization Molding

Example 1

The mixture of 2.05 parts by weight of hollow particles (1) manufactured in Example of manufacture 1 and having the further expansion ratio of 50.0%, 100 parts by weight of ethylene-propylene-unconjugated diene copolymer rubber having the Mooney viscosity ML (1+4) of 54 at 100° C. determined according to JIS K6300-1 (2013), 100 parts by weight of talc as a filler, 20 parts by weight of process oil, 3.5 parts by weight of Sanceler PZ as a dithiocarbamate vulcanization accelerator and 0.4 parts by weight of sulfur was knead in a kneader at 60° C. for about 10 minutes to be prepared into a rubber composition for vulcanization molding. The result is shown in Table 4. In Tables 4 to 6, EPDM, NBR, NR and CR mean ethylene-propylene-unconjugated diene copolymer rubber, acrylonitrile-butadiene rubber, natural rubber and chloroprene rubber, respectively.

The true specific gravity of the rubber composition for vulcanization molding ($d_3$) was determined by the analytical electronic balance AX200 (manufactured by Shimadzu Corporation) with the specific gravity measurement mode for solid substance, and the result was 0.97. The theoretical true specific gravity ($d_5$) of the rubber composition was 0.96 and the breakage ratio of the hollow particles in the rubber composition was 3.71%.

TABLE 4

| | | | Examples | | | | | |
|---|---|---|---|---|---|---|---|---|
| | | | 1 | 2 | 3 | 4 | 5 | 6 |
| Rubber composition | Base rubber | Base rubber | EPDM | EPDM | EPDM | EPDM | EPDM | EPDM |
| | | Mooney viscosity ML (1 + 4) (100° C.) | 54 | 54 | 42 | 42 | 42 | 73 |
| | | Amount (parts by weight) | 100 | 100 | 100 | 100 | 100 | 100 |
| | Filler | Talc (parts by weight) | 100 | 100 | 100 | 100 | 100 | 100 |
| | | Glass balloon (parts by weight) | 0 | 0 | 0 | 0 | 0 | 0 |
| | Softener | Process oil (parts by weight) | 20 | 20 | 50 | 50 | 50 | 50 |
| | Vulcanizing agent | Vulcanization accelerator (parts by weight) | 3.5 | 3.5 | 4 | 4 | 2 | 3.5 |
| | | Sulfur (parts by weight) | 0.4 | 0.4 | 0.6 | 0.6 | 0.5 | 0.7 |
| | Masterbatch | Hollow particles | Hollow particles used | Hollow particles (1) | Hollow particles (1) | Hollow particles (2) | Hollow particles (2) | Hollow particles (2) | Hollow particles (3) |
| | | | Further expansion ratio (%) | 50 | 50 | 22.2 | 22.2 | 22.2 | 72.4 |
| | | | Amount (parts by weight) | 2.05 | 4.1 | 0.9 | 2.7 | 6.2 | 9.0 |
| | | Liquid organic compound | Process oil (parts by weight) | 0 | 0 | 25 | 20 | 0 | 20 |
| | | Organic base material | Organic base material | — | — | — | NBR | — | — |
| | | | Mooney viscosity ML (1 + 4) (100° C.) | — | — | — | 30 | — | — |
| | | | Parts by weight | 0 | 0 | 0 | 40 | 0 | 0 |
| Kneading | | Kneader | Kneader | Kneader | Open roll mill | Kneader | Kneader | Kneader |
| | Rubber composition | Theoretical true specific gravity (d5) | 0.96 | 0.75 | 1.06 | 0.86 | 0.60 | 1.13 |
| | | Actual true specific gravity (d3) | 0.97 | 0.78 | 1.065 | 0.88 | 0.63 | 1.15 |
| | | Breakage ratio (%) | 3.71 | 9.13 | 1.83 | 6.49 | 8.96 | 18.28 |
| Vulcanization molding | | Vulcanization process | Compression molding | Compression molding | Extrusion molding | Extrusion molding | Compression molding | Injection molding |
| | | Vulcanization molding temperature | 140° C. | 140° C. | 150° C. | 150° C. | 170° C. | 180° C. |
| | Molded product | True specific gravity (d4) | 0.96 | 0.76 | 1.07 | 0.88 | 0.61 | 1.17 |
| | | Lightweight effect | Excellent | Excellent | Excellent | Excellent | Excellent | Excellent |
| | | Appearance | Excellent | Excellent | Excellent | Excellent | Excellent | Excellent |
| | | Dimensional stability | Excellent | Excellent | Excellent | Excellent | Excellent | Excellent |
| | | Comprehensive evaluation | Excellent | Excellent | Excellent | Excellent | Excellent | Excellent |

TABLE 5

| | | | Examples | | | | | |
|---|---|---|---|---|---|---|---|---|
| | | | 7 | 8 | 9 | 10 | 11 | 12 |
| Rubber composition | Base rubber | Base rubber | NBR | NR | CR | EPDM | EPDM | EPDM |
| | | Mooney viscosity ML (1 + 4) (100° C.) | 30 | 83 | 61 | 73 | 76 | 42 |
| | | Amount (parts by weight) | 100 | 100 | 100 | 100 | 100 | 100 |
| | Filler | Talc (parts by weight) | 100 | 80 | 100 | 100 | 100 | 100 |
| | | Glass balloon (parts by weight) | 0 | 0 | 0 | 0 | 0 | 20 |
| | Softener | Process oil (parts by weight) | 60 | 30 | 50 | 40 | 50 | 50 |
| | Vulcanizing agent | Vulcanization accelerator (parts by weight) | 3.5 | 2.2 | 2 | 2 | 2 | 2 |
| | | Sulfur (parts by weight) | 0.6 | 1 | 0.8 | 0.7 | 0.5 | 0.5 |
| | Masterbatch | Hollow particles | Hollow particles used | Hollow particles (4) | Hollow particles (5) | Hollow particles (6) | Hollow particles (7) | Hollow particles (8) | Hollow particles (2) |
| | | | Further expansion ratio (%) | 30.2 | 49.3 | 74.7 | 48.8 | 69.7 | 22.2 |
| | | | Amount (parts by weight) | 2.9 | 1.5 | 4.7 | 12.0 | 2.3 | 6.2 |
| | | Liquid organic compound | Process oil (parts by weight) | 20 | 0 | 20 | 0 | 0 | 0 |
| | | Organic base material | Organic base material | EPDM | — | — | — | — | — |
| | | | Mooney viscosity ML (1 + 4) (100° C.) | 42 | — | — | — | — | — |
| | | | Parts by weight | 40 | 0 | 0 | 0 | 0 | 0 |

TABLE 5-continued

|  |  |  | Examples | | | | | |
|---|---|---|---|---|---|---|---|---|
|  |  |  | 7 | 8 | 9 | 10 | 11 | 12 |
| Kneading |  | Kneader | Open roll | Open roll | Open roll mill | Open roll mill | Kneader mill | Kneader mill |
|  | Rubber composition | Theoretical true specific gravity (d5) | 0.99 | 1.13 | 1.00 | 1.02 | 0.94 | 0.58 |
|  |  | Actual true specific gravity (d3) | 1.01 | 1.16 | 1.03 | 1.04 | 0.98 | 0.61 |
|  |  | Breakage ratio (%) | 13.84 | 26.40 | 14.65 | 5.70 | 16.73 | 10.64 |
| Vulcanization molding |  | Vulcanization process | Compression molding | Compression molding | Compression molding | Compression molding | Injection molding | Compression molding |
|  |  | Vulcanization molding temperature | 160° C. | 160° C. | 160° C. | 160° C. | 180° C. | 170° C. |
|  | Molded product | True specific gravity (d4) | 0.97 | 1.11 | 1.00 | 1.04 | 0.97 | 0.62 |
|  |  | Lightweight effect | Excellent | Excellent | Excellent | Excellent | Excellent | Excellent |
|  |  | Appearance | Excellent | Excellent | Excellent | Excellent | Fair | Excellent |
|  |  | Dimensional stability | Excellent | Excellent | Excellent | Excellent | Excellent | Excellent |
|  |  | Comprehensive evaluation | Excellent | Excellent | Excellent | Excellent | Fair | Excellent |

TABLE 6

|  |  |  | Comparative Examples | | | | | |
|---|---|---|---|---|---|---|---|---|
|  |  |  | 1 | 2 | 3 | 4 | 5 | 6 |
| Rubber composition | Base rubber | Base rubber | EPDM | EPDM | EPDM | EPDM | NBR | NR |
|  |  | Mooney viscosity ML (1 + 4) (100° C.) | 97 | 54 | 54 | 95 | 110 | 105 |
|  |  | Amount (parts by weight) | 100 | 100 | 100 | 100 | 100 | 100 |
|  | Filler | Talc (parts by weight) | 100 | 100 | 100 | 100 | 100 | 100 |
|  | Softener | Process oil (parts by weight) | 20 | 20 | 50 | 50 | 50 | 60 |
|  | Vulcanizing agent | Vulcanization accelerator (parts by weight) | 3.5 | 3.5 | 4 | 4 | 3.5 | 3.5 |
|  |  | Sulfur (parts by weight) | 0.4 | 0.4 | 0.6 | 0.6 | 0.7 | 0.6 |
|  | Masterbatch | Hollow particles used | Hollow particles (1) | Hollow particles (10) | Hollow particles (11) | Hollow particles (9) | Hollow particles (2) | Hollow particles (2) |
|  |  | Further expansion ratio (%) | 50 | 16.7 | 82.4 | 21.3 | 22.2 | 22.2 |
|  |  | Amount (parts by weight) | 1.5 | 2.5 | 1.2 | 13.0 | 2.0 | 3.0 |
|  | Liquid organic compound | Process oil (parts by weight) | 0 | 0 | 25 | 35 | 0 | 0 |
|  | Organic base material | Organic base material | — | — | — | EPDM | — | — |
|  |  | Mooney viscosity ML (1 + 4) (100° C.) | — | — | — | 95 | — | — |
|  |  | Parts by weight | 0 | 0 | 0 | 40 | 0 | 0 |
| Kneading |  | Kneader | Kneader | Kneader | Open roll mill | Kneader | Kneader | Kneader |
|  | Rubber composition | Theoretical true specific gravity (d5) | 1.04 | 0.74 | 1.11 | 1.00 | 0.93 | 0.82 |
|  |  | Actual true specific gravity (d3) | 1.15 | 0.85 | 1.13 | 1.17 | 1.13 | 1.15 |
|  |  | Breakage ratio (%) | 41.02 | 28.97 | 17.10 | 86.94 | 65.70 | 82.36 |
| Vulcanization molding |  | Vulcanization process | Compression molding | Compression molding | Extrusion molding | Extrusion molding | Injection molding | Compression molding |
|  |  | Vulcanization molding temperature | 140° C. | 140° C. | 150° C. | 150° C. | 180° C. | 140° C. |
|  | Molded product | True specific gravity (d4) | 1.17 | 0.91 | 0.93 | 1.19 | 1.15 | 1.16 |
|  |  | Lightweight effect | Poor | Poor | Excellent | Poor | Poor | Poor |
|  |  | Appearance | Excellent | Excellent | Poor | Excellent | Excellent | Excellent |
|  |  | Dimensional stability | Excellent | Poor | Poor | Excellent | Excellent | Excellent |
|  |  | Comprehensive evaluation | Poor | Poor | Poor | Poor | Poor | Poor |

Examples 2 to 12

In Examples 3, 4, 7 and 9, Hollow particles (2), (4) and (6) (the hollow particles A1) were wet with the process oil as the liquid organic compound to be prepared into the hollow particles A3, and added to the rubber compositions as shown in Tables 4 and 5. In Example 4, Hollow particles (2) (the hollow particles A3) were blended with acrylonitrile-butadiene rubber (NBR) as the organic base material to be prepared into the masterbatch and added to the rubber composition. In Example 7, Hollow particles (4) (the hollow particles A3) were blended with ethylene-propylene-unconjugated diene rubber (EPDM) as the organic base material to be prepared into the masterbatch and added to the rubber composition.

In Example 6, Hollow particles (3) (the hollow particles A2) were wet with the process oil to be prepared into the hollow particles A4 and added to the rubber composition as shown in Table 4.

The rubber compositions of Examples 2, 4 to 6, 11 and 12 were kneaded with the kneader at 60° C. for 10 minutes in the same manner as that of Example 1 except that shown in Tables 4 and 5 to be prepared into the rubber compositions for vulcanization molding.

The rubber compositions of Examples 3 and 7 to 10 were kneaded with the open roll mill at 65° C. for 20 minutes in the same manner as that of Example 1 except that shown in Tables 4 and 5 to be prepared into the rubber compositions for vulcanization molding.

Molded Rubber Product

Example 1

The rubber composition containing Hollow particles (1) and having the true specific gravity ($d_3$) of 0.97 prepared in Example 1 was placed in a mold (4 cm by 7 cm) of a compression molding machine, and vulcanized at 140° C. for 30 minutes with the molding pressure of 15 MPa. The true specific gravity ($d_4$) of the resultant molded rubber product was determined by the analytical electronic balance AX200 (manufactured by Shimadzu Corporation) with the specific gravity measurement mode for solid substance, and the result was 0.96. The molded rubber product was evaluated to be lightweight enough in the test, considering the theoretical specific gravity ($d_5$) of the rubber compound, 0.96. The molded rubber product had good dimensional stability with almost no change in its volume and had good appearance.

Examples 2, 5, 7 to 10 and 12

The rubber compositions of Examples 2, 5, 7 to 10 and 12 containing the hollow particles shown in Tables 4 and 5 were vulcanization molded in the same manner as that of Example 1 except that shown in Tables 4 and 5 to be manufactured into molded rubber products.

Each of the molded rubber products were evaluated to be lightweight enough in the test, and had good dimensional stability and good appearance.

Example 3

The rubber composition containing Hollow particles (2) and having the true specific gravity ($d_3$) of 1.065 prepared in Example 3 was extruded from a die of an extrusion molding machine to be formed into a predetermined cross sectional shape, and vulcanized at 150° C. for 15 minutes in a vulcanization furnace to be manufactured into a molded product.

The true specific gravity ($d_4$) of the resultant molded rubber product was determined by the analytical electronic balance AX200 (manufactured by Shimadzu Corporation) with the specific gravity measurement mode for solid substance, and the result was 1.07. The molded rubber product was evaluated to be lightweight enough in the test, considering the theoretical specific gravity ($d_5$) of the rubber compound, 1.06. The molded rubber product had good dimensional stability and good appearance.

Example 4

The rubber composition of Example 4 containing Hollow particles (2) shown in Tables 4 was vulcanization molded in the same manner as that of Example 3 except that shown in Table 4 to be manufactured into a molded rubber product.

The molded rubber product was evaluated to be lightweight enough in the test, and had good dimensional stability and good appearance.

Example 6

The rubber composition containing Hollow particles (3) and having the true specific gravity ($d_3$) of 1.15 prepared in Example 6 was molded by an injection molding machine with the cylinder temperature of 180° C., die temperature of 60° C. and injection pressure of 15 MPa and vulcanized to be manufactured into a molded rubber product. The true specific gravity ($d_4$) of the resultant molded rubber product was determined by the analytical electronic balance AX200 (manufactured by Shimadzu Corporation) with the specific gravity measurement mode for solid substance, and the result was 1.17. The molded rubber product was evaluated to be lightweight enough in the test, considering the theoretical specific gravity ($d_5$) of the rubber compound, 1.13. The molded rubber product had good dimensional stability with almost no change in its volume and had good appearance.

Example 11

The rubber composition of Example 11 containing Hollow particles (8) shown in Tables 5 was vulcanization molded in the same manner as that of Example 6 except that shown in Table 5 to be manufactured into a molded rubber product. The resultant molded rubber product was evaluated to be lightweight enough in the test, and had good dimensional stability. Although the surface of the product had a few unevennesses because of the large mean particle size (D50) of the Hollow particles (8), 129.8 μm, contained in the product, the hollow particles did not re-expand in the vulcanization molding and the product was acceptable with no problems.

Comparative Example 1

The mixture of 1.5 parts by weight of Hollow particles (1) manufactured in Example of manufacture 1 and having the further expansion ratio of 50.0%, 100 parts by weight of ethylene-propylene-unconjugated diene copolymer rubber having the Mooney viscosity ML (1+4) determined according to JIS K6300-1 (2013) at 100° C. of 97, 100 parts by weight of talc as a filler, 20 parts by weight of process oil, 3.5 parts by weight of Sanceler PZ as a dithiocarbamate vulcanization accelerator and 0.4 parts by weight of sulfur was kneaded in a kneader at 60° C. for about 10 minutes to be prepared into a rubber composition.

The true specific gravity of the rubber composition for vulcanization molding ($d_3$) was determined by the analytical electronic balance AX200 (manufactured by Shimadzu Corporation) with the specific gravity measurement mode for solid substance, and the result was 1.15. The theoretical true specific gravity ($d_5$) of the rubber composition was 1.04 and the breakage ratio of the hollow particles in the rubber composition was 41.02%.

The rubber composition was placed in a mold (4 cm by 7 cm) of a compression molding machine, and vulcanized at 140° C. for 30 minutes with the molding pressure of 15 MPa. The resultant molded rubber product had the true specific gravity ($d_4$) of 1.17, and considerable amount of the hollow particles broke due to the high Mooney viscosity of the base rubber to fail to attain lightweight effect of the product.

Comparative Example 2

The rubber composition was prepared in the same manner as that of Comparative Example 1 except that shown in Table 6 and except that Hollow particles (10) manufactured in Comparative Example of manufacture 1 and having the further expansion ratio of 16.7% was used.

The true specific gravity of the resultant rubber composition ($d_3$) was determined by the analytical electronic balance AX200 (manufactured by Shimadzu Corporation) with the specific gravity measurement mode for solid substance, and the result was 0.85. The theoretical true specific gravity ($d_5$) of the rubber composition was 0.74 and the breakage ratio of the hollow particles in the rubber composition was 28.97%.

The rubber composition was manufactured into a molded product in the same manner as that of Comparative Example 1 except that shown in Table 6. The true specific gravity ($d_4$) of the resultant molded rubber product was 0.91. Considerable amount of the hollow particles in the rubber composition broke in the kneading and molding processes due to their further expansion ratio of 16.7%, which is below 20%, to fail to attain a lightweight effect of the molded product. In addition, the molded product had poor dimensional stability, because the volume of the product decreased due to the breakage and dent of the hollow particles during vulcanization molding.

Comparative Example 3

A rubber composition containing Hollow particles (11) manufactured in Comparative Example of manufacture 2 and having the further expansion ratio of 82.4% was kneaded with the open roll mill at 60° C. for 20 minutes in the same manner as that of Comparative Example 1 except that shown in Table 6 to be prepared into the rubber composition. The resultant rubber composition had the true specific gravity ($d_3$) of 1.13 and the breakage ratio of Hollow particles (11) was 17.10%.

The resultant rubber composition was extruded from a die of an extrusion molding machine to be formed into a product having a predetermined cross sectional shape, and vulcanized at 150° C. for 15 minutes in a vulcanization furnace to be manufactured into a molded rubber product.

A considerable amount of Hollow particles (11) in the rubber composition re-expanded during vulcanization molding due to their further expansion ratio of 82.4%, which is above 80%, to result in the molded rubber product having poor dimensional stability and poor appearance represented by many unevennesses on the surface.

Comparative Examples 4 to 6

In Comparative Examples 4 to 6, Hollow particles (9) and (2) were used as shown in Table 6. In Comparative Example 4, the masterbatch containing Hollow particles (9) wet with the liquid organic compound (process oil) and ethylene-propylene-unconjugated diene copolymer rubber (EPDM) was used as shown in Table 6. The rubber compositions in Comparative Examples 4 to 6 were prepared in the same manner as that of Comparative Example 1 except that shown in Table 6.

In Comparative Example 4, the resultant rubber composition was extruded from a die of an extrusion molding machine to be formed into a product having a predetermined cross sectional shape, and vulcanized at 150° C. for 15 minutes in a vulcanization furnace to be manufactured into a molded rubber product.

In Comparative Example 5, the resultant rubber composition was molded by an injection molding machine with the cylinder temperature at 180° C., die temperature at 60° C. and injection pressure of 15 MPa and vulcanized to be manufactured into a molded rubber product.

In Comparative Example 6, a molded rubber product was manufactured in the same manner as that of Comparative Example 1, except that shown in Table 6.

The molded rubber products of Comparative examples 4 to 6 did not have properties satisfactory in the comprehensive evaluation.

INDUSTRIAL APPLICABILITY

The rubber composition for vulcanization molding of the present invention is processed in vulcanization molding to be manufactured into molded rubber products preferable for various end uses including automotive parts; electric and electronic parts; civil engineering and construction parts; rollers for office automation equipment; industrial rollers; and parts for general industries.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the invention.

The invention claimed is:

1. A rubber composition for vulcanization molding comprising hollow particles and a base rubber;
    wherein the hollow particles are composed of a thermoplastic resin shell and a thermally vaporizable blowing agent encapsulated therein, and have a further expansion ratio ranging from 20 to 80% as defined by the following formula (1); and
    wherein the base rubber has a Mooney viscosity ML (1+4) ranging from 5 to 90 at 100° C.:

$$\text{Further expansion ratio (\%)} = (1 - d_2/d_1) \times 100 \qquad (1)$$

where $d_2$ is a true specific gravity of the hollow particles in a state of maximum re-expansion by heating at a maximum re-expansion temperature, and $d_1$ is a true specific gravity of the hollow particles and $d_1$ ranges from 0.02 to 0.40.

2. The rubber composition for vulcanization molding as claimed in claim 1, wherein the base rubber contains at least one selected from the group consisting of ethylene-α-olefin-unconjugated diene copolymer rubber, butadiene rubber, styrene-butadiene rubber, natural rubber, isoprene rubber, nitrile rubber, hydrogenated nitrile rubber, butyl rubber, fluorine rubber, silicone rubber, acrylonitrile-butadiene rubber, chloroprene rubber, acrylic rubber, chlorosulfonated polyethylene rubber, chlorinated polyethylene rubber, urethane rubber, isobutylene-isoprene rubber, polysulfide rubber, propylene oxide rubber and epichlorohydrin rubber.

3. The rubber composition for vulcanization molding as claimed in claim 1, wherein the amount of the hollow particles in the rubber composition for vulcanization molding ranges from 0.1 to 30 wt % and the amount of the base rubber in the rubber composition for vulcanization molding from 10 to 95 wt %.

4. The rubber composition for vulcanization molding as claimed in claim 1, wherein the thermoplastic resin is obtained by polymerizing a polymerizable component containing a nitrile monomer.

5. The rubber composition for vulcanization molding as claimed in claim 4, wherein the polymerizable component further contains a carboxyl-group-containing monomer.

6. The rubber composition for vulcanization molding as claimed in claim 1, wherein an escape-initiation temperature of the blowing agent from the hollow particles ranges from 110 to 350° C.

7. The rubber composition for vulcanization molding as claimed in claim 1, wherein the mean particle size of the hollow particles ranges from 15 to 100 µm.

8. The rubber composition for vulcanization molding as claimed in claim 1, wherein the hollow particles are further composed of a fine particle coating the outer surface of the shell.

9. A rubber product manufactured from the rubber composition for vulcanization molding as claimed in claim 1.

10. A rubber product as claimed in claim 9, the rubber product is selected from the group consisting of a weatherstrip, a rubber blanket for printing, an automotive water hose, an air hose, a roofing sheet, a wire covering material and a shoe sole.

11. The rubber composition for vulcanization molding as claimed in claim 1, wherein $d_1$ ranges from 0.02 to 0.20.

12. The rubber composition for vulcanization molding as claimed in claim 1, wherein the mean thickness of the shell of the hollow particles ranges from 0.1 to 1.5 µm.

13. The rubber composition for vulcanization molding as claimed in claim 4, wherein the nitrile monomer comprises methacrylonitrile monomer in an amount of from 5 to 90 wt %.

14. A process for manufacturing the rubber composition for vulcanization molding as claimed in claim 1, the process comprising;
   (I) manufacturing hollow particles composed of a thermoplastic resin shell and a thermally vaporizable blowing agent encapsulated therein and having a further expansion ratio ranging from 20 to 80% as defined by the following formula (1); and
   (II) kneading a composition containing at least one ingredient selected from the group consisting of the hollow particles manufactured by the process (I) and a masterbatch containing the hollow particles and a liquid organic compound and/or an organic base material, and a base rubber having a Mooney viscosity ML (1+4) ranging from 5 to 90 at 100° C.:

Further expansion ratio $$(\%) = (1 - d_2/d_1) \times 100 \tag{1}$$

where $d_2$ is a true specific gravity of the hollow particles in a state of maximum re-expansion by heating at a maximum re-expansion temperature, and $d_1$ is a true specific gravity of the hollow particles and $d_1$ ranges from 0.02 to 0.40.

* * * * *